United States Patent
Stenersen et al.

(10) Patent No.: US 6,780,534 B2
(45) Date of Patent: Aug. 24, 2004

(54) FILTER ASSEMBLY FOR INTAKE AIR OF FUEL CELL

(75) Inventors: Elvind Stenersen, River Falls, WI (US); William Michael Nyman, Eagan, MN (US); Richard Thomas Canepa, Plymouth, MN (US)

(73) Assignee: Donaldson Company, Inc., Minneapolis, MN (US)

(*) Notice: Subject to any disclaimer, the term of this patent is extended or adjusted under 35 U.S.C. 154(b) by 280 days.

(21) Appl. No.: 09/832,715

(22) Filed: Apr. 11, 2001

(65) Prior Publication Data

US 2002/0150805 A1 Oct. 17, 2002

(51) Int. Cl.[7] .............................................. H01M 8/18
(52) U.S. Cl. ........................ 429/19; 429/12; 429/30; 429/33; 429/34; 96/153; 96/154; 96/380; 96/381; 96/383; 96/132; 96/134
(58) Field of Search .................... 96/153, 154, 380, 96/381, 383, 384, 132, 134; 429/30, 33, 12, 19, 34

(56) References Cited

U.S. PATENT DOCUMENTS

| | | |
|---|---|---|
| 3,847,672 A | 11/1974 | Trocciola et al. |
| 4,080,791 A | 3/1978 | Nadler et al. |
| 4,595,642 A | 6/1986 | Nakanishi et al. |
| 4,737,173 A | 4/1988 | Kudirka et al. |
| 5,013,617 A | 5/1991 | Scheffler |
| 5,156,925 A | 10/1992 | Lapp |
| 5,189,092 A | 2/1993 | Koslow |
| 5,221,586 A | 6/1993 | Morimoto et al. |
| 5,331,037 A | 7/1994 | Koslow |
| 5,366,821 A | 11/1994 | Merritt et al. |
| 5,372,617 A | 12/1994 | Kerrebrock et al. |
| 5,458,095 A | 10/1995 | Post et al. |
| 5,626,820 A | 5/1997 | Kinkead et al. |
| 5,641,031 A | 6/1997 | Riemer et al. |
| 5,646,852 A | 7/1997 | Lorenz et al. |
| 5,662,184 A | 9/1997 | Riemer et al. |
| 5,792,247 A | 8/1998 | Gillingham et al. |
| 5,794,732 A | 8/1998 | Lorenz et al. |
| 5,837,393 A | 11/1998 | Okamoto |
| 5,944,878 A | 8/1999 | Lindhe |
| 5,981,096 A | 11/1999 | Hornburg et al. |
| 6,007,930 A | 12/1999 | Adams et al. |
| 6,013,385 A | 1/2000 | DuBose |
| 6,057,051 A | 5/2000 | Uchida et al. |
| 6,074,769 A | 6/2000 | Johnssen ..................... 429/17 |
| 6,124,052 A | 9/2000 | Katoh et al. |
| 6,152,996 A | 11/2000 | Linnersten et al. |
| 6,179,890 B1 * | 1/2001 | Ramos et al. ................. 55/482 |
| 6,190,432 B1 | 2/2001 | Gieseke et al. |
| 6,284,397 B1 | 9/2001 | Barton |
| 6,296,957 B1 | 10/2001 | Graage |
| 6,309,769 B1 | 10/2001 | Haug |
| 6,316,134 B1 | 11/2001 | Cownden et al. |
| 6,420,059 B1 | 7/2002 | Surampudi et al. ........... 429/13 |
| 6,432,177 B1 * | 8/2002 | Dallas et al. ................. 96/153 |
| 6,436,562 B1 | 8/2002 | DuBose ....................... 429/13 |
| 2001/0049036 A1 | 12/2001 | Raiser |

FOREIGN PATENT DOCUMENTS

| | | |
|---|---|---|
| EP | 0677417 | 2/1995 |
| EP | 0 837 238 A2 | 6/1997 |
| EP | 1 158 590 A2 | 4/2001 |
| EP | 1 162 354 A2 | 4/2001 |
| EP | 1 195 830 A2 | 10/2001 |
| GB | 2250130 | 11/1990 |
| JP | 09026177 | 1/1997 |
| WO | WO 01/48850 | 7/2001 |

OTHER PUBLICATIONS

Moore, J. et al., "The effects of battlefield contaminants on PEMFC performance", *Journal of Power Sources*, vol. 85, pp. 254–260 (2000), no month available.

Sakamoto, S. et al., "Study of the Factors Affecting PEFC Life Characteristic", *Ecology and Energy Systems Research Center, Sanyo Electric Co., Ltd.*, Tochigi 326–8534, Japan, pp. 141–144 (date unknown).

* cited by examiner

*Primary Examiner*—Bruce F. Bell
(74) *Attorney, Agent, or Firm*—Merchant & Gould P.C.

(57) ABSTRACT

A filter assembly for removing particulate contaminants and chemical contaminants from an incoming dirty air stream for a fuel cell. The filter assembly also includes a noise suppression element that reduces noise emanating from any equipment, such as a compressor. The filter assembly can include a particulate filter portion for removing physical or particulate contaminants, a chemical filter portion for removing chemical contaminants, or can have both portions.

19 Claims, 18 Drawing Sheets

FILTER ASSEMBLY FOR INTAKE AIR OF FUEL CELL

FIELD OF THE DISCLOSURE

The present disclosure is related to air filtering systems for intake air for low temperature catalytic processes, such as a fuel cell. In particular, the disclosure is directed to a filter assembly that removes particulate and chemical contaminants from the intake air, and that also provides sound attenuation.

BACKGROUND OF THE DISCLOSURE

Practical and efficient generation of electrical energy has been sought since the discovery of electricity. Hydroelectric, fossil fuel and nuclear generation plants and batteries have long been used to supply our electrical power needs. Power generation by use of fuel cells is a relatively recent development that is rapidly gaining acceptance for both commercial and residential applications. As compared with conventional fossil fuel burning powered sources, they are relatively clean and efficient. Fuel cells are electrochemical devices that efficiently convert a fuel's chemical energy directly to electrical energy. They chemically combine a fuel and oxidant without burning, thereby eliminating many inefficiencies and most pollution of traditional combustion power systems.

A fuel cell operates in principle much like a battery. However, unlike a battery, a fuel cell does not run down or require recharging. It will continue to produce energy in the form of electricity and heat as long as fuel is supplied to it. In general, a fuel cell consists of two electrodes (an anode and a cathode) sandwiched around an electrolyte. Hydrogen and oxygen are passed over the anode and cathode electrodes respectively in a manner that generates a voltage between the electrodes, creating electricity and heat, and producing water as the primary by-product.

The hydrogen fuel is supplied to the anode of the fuel cell. Some consume hydrogen directly, while others use a fuel reformer to extract the hydrogen from, for example, a hydrocarbon fuel such as natural gas, methanol, ethanol, or gasoline. Oxygen enters the fuel cell at the cathode. The oxygen can be supplied in purified form or can come directly from atmospheric air.

The fuel cell uses a catalyst to cause the hydrogen atom to split into a proton and an electron, each of which takes a different path to the cathode. The protons pass through the electrolyte. The electrons create a useful electric current that can be used as an energy source, before returning to the anode where they are reunited with the hydrogen protons and the oxygen to form water.

Fuel cells are generally characterized by the electrolyte material which is sandwiched between the cathode and anode, and which serves as a bridge for ion exchange. There are five main known types of fuel cells. Alkaline fuel cells (AFCs) contain a liquid alkaline electrolyte and have been used primarily in space mission applications. Proton exchange membrane fuel cells (PEMFCs) contain a solid polymer electrolyte. Their low temperature operation, high power density with the ability to vary their output quickly to meet shifts in power demand make their use ideal for both mobile and stationary applications, such as powering vehicles or buildings. Phosphoric acid fuel cells (PAFCs) utilize a phosphoric acid electrolyte and are currently used for commercial power generation. Molten carbonate fuel cells (MCFCs) contain a carbonate salt electrolyte, which becomes molten at the operating temperature of about 650° C. Solid oxide fuel cells (SOFCs) use a ceramic electrolyte material and operate up to about 1000° C. Both the MCFCs and the SOFCs can use carbon monoxide as fuel.

Fuel cells have a vast range of potential applications. They can be used to produce electricity for homes, businesses and industries through stationary power plants ranging in size from, for example, 100 watts to several mega watts. Fuel cells produce a direct current (dc) that must be inverted to alternating current for grid-connected applications or for use with most consumer products. However, future fuel cells could be operated in both grid-connected and non-grid-connected modes. For residential applications, smaller fuel cell power plants could be installed for the production of both heat and power. They could also be used to provide power to remote residential entities having no access to primary grid power, potentially eliminating the necessity of grid-connections.

In addition to the larger scale power production applications, fuel cells could replace batteries that power consumer electronic products such as laptop computers, cellular phones and the like and could even be micromachined to provide power directly to computer chips. Another promising commercial application of fuel cells is their potential to replace the internal combustion engine in vehicle and transportation applications. Their applications are virtually unlimited.

All of the known fuel cell configurations discussed above have a common need for oxygen as an integral ingredient for performing the cell's chemical process. For most commercial applications it is desirable for such oxygen to be supplied directly from the atmospheric air. However, it is accepted that in today's world, all atmospheric air has some degree of contaminants present in it. Such contaminants can be relatively large such as loose debris, insects, tree blossoms or the like, or can be in the nature of small particulates suspended in the atmosphere such as dust, tree pollen, smog or smoke particulates. Chemical contaminants are also widely present in atmospheric air, whether as a result of man-made pollution or as those which naturally occur. Typical chemical contaminants might include volatile organic compounds such as aromatic hydrocarbons, methane, butane, propane and other hydrocarbons as well as ammonia, oxides of nitrogen, ozone, smog, oxides of sulfur, carbon monoxide, hydrogen sulfide, etc. Since efficient fuel cell operation depends on a delicately balanced chemical reaction, such contaminants in the air used by the cell can have a significant adverse effect on the cell's operation and, depending on their nature, can even cause the fuel cell to discontinue operation. It is important therefore, that the fuel cell system include a filtration system that is designed to eliminate harmful contaminants and one that enables the fuel cell to be used in a wide range of use environments. Such contaminants may appear intentionally (such as in military environments or by terrorists) or unintentionally. Solution of the latter requirement becomes particularly acute when the fuel cell is used in a mobile application that subjects the fuel cell to many varied atmospheric conditions.

To obtain the amount of oxygen necessary for the fuel cell to produce the desired energy output, it has been found desirable to pass the oxygen-bearing containing air through air movement equipment such as a compressor or fan located within the air flow stream supplied to the fuel cell. Unfortunately, while the fuel cell chemical reaction is a silent process, typical compressors produce significant undesirable and annoying noise levels. It is desirable, therefore, in a fuel cell system to reduce and to minimize the noise produced by and/or transmitted through the compressor and back into the environment in which the fuel cell system operates. Since reduced fuel cell system size is also typically desirable, it is preferable that the filtration and sound attenuation features of the fuel cell system be physically reduced as small as possible and even preferably be combined within a single element or housing. The present invention addresses the above-identified needs and desires for an efficient and quiet fuel cell system for use in a wide variety of applications.

What is desired, therefore, is a fuel cell that functions within environments having a wide range of contaminants.

SUMMARY OF THE DISCLOSURE

The present invention provides a filter assembly for filtering the intake air used in low temperature catalytic reactions, such as fuel cells. The assembly provides particulate filtration and chemical filtration to the incoming air stream to provide a purified oxidant to the cathodic side of a catalytic reactor, such as a fuel cell. The filter assembly captures and retains particulate and chemical contaminants that can harm the catalytic process, the electrolyte, or both. Although the operation of the fuel cell is essentially silent, the assembly also provides sound suppression or attenuation for any equipment, such as a compressor, operatively connected with the fuel cell.

In one particular embodiment, the invention is directed to a system for producing power. The system comprises an air filter assembly that comprises a housing and a filter element in the housing. The housing has an inlet and an outlet, the inlet accepting dirty atmospheric air to the filter assembly, and the outlet providing clean air from the filter assembly. The filter element comprises at least a physical or particulate filter portion constructed and arranged to remove particulate contaminants from the dirty air. The filter element may also include a chemical filter portion constructed and arranged to remove chemical contaminants from the dirty air. The filter assembly also includes a sound suppression or attenuation element, which may also be in the housing. The sound suppression element is configured to provide broadband attenuation of the sound passing through the filter assembly.

The system further comprises a fuel cell having an air intake port. The air filter assembly is constructed and arranged to provide clean air from the outlet of the filter assembly to the intake port of the fuel cell. The filter assembly is particularly designed and configured to remove contaminants that might harm or poison the reactions occurring within the fuel cell.

The system generally also comprises equipment, such as a compressor or a blower, to provide enhanced air flow to the equipment, such as the fuel cell. The filter assembly is also particularly arranged to reduce the level of noise emanating from any such equipment and from the fuel cell system to which such equipment may be connected.

In another particular embodiment of the invention, a filter assembly is provided. The filter assembly has a housing and a filter element in the housing. The housing has an inlet and an outlet, the inlet receiving dirty air into the filter assembly, and the outlet providing clean filtered air from the filter assembly. The filter element has a particulate filter portion constructed and arranged to remove physical or particulate contaminants from the dirty air and may have a chemical filter portion constructed and arranged to remove chemical contaminants from the dirty air. The filter assembly also has a sound suppression element, such as a resonator, sonic choke, full choke, sound adsorbent material, that attenuates or otherwise reduces sound by at least 3 dB at one meter, preferably by at least 6 dB.

Such a filter assembly can be used with any process or system that produces noise or sound and that benefits from cleaner intake gas (such as air). A fuel cell system is one power producing system with which filter assembly of the present invention can be used. Additionally, the filter assembly can be used with other power producing systems, such as diesel or gasoline engines.

DETAILED DESCRIPTION OF THE PREFERRED EMBODIMENT

Figure 1:
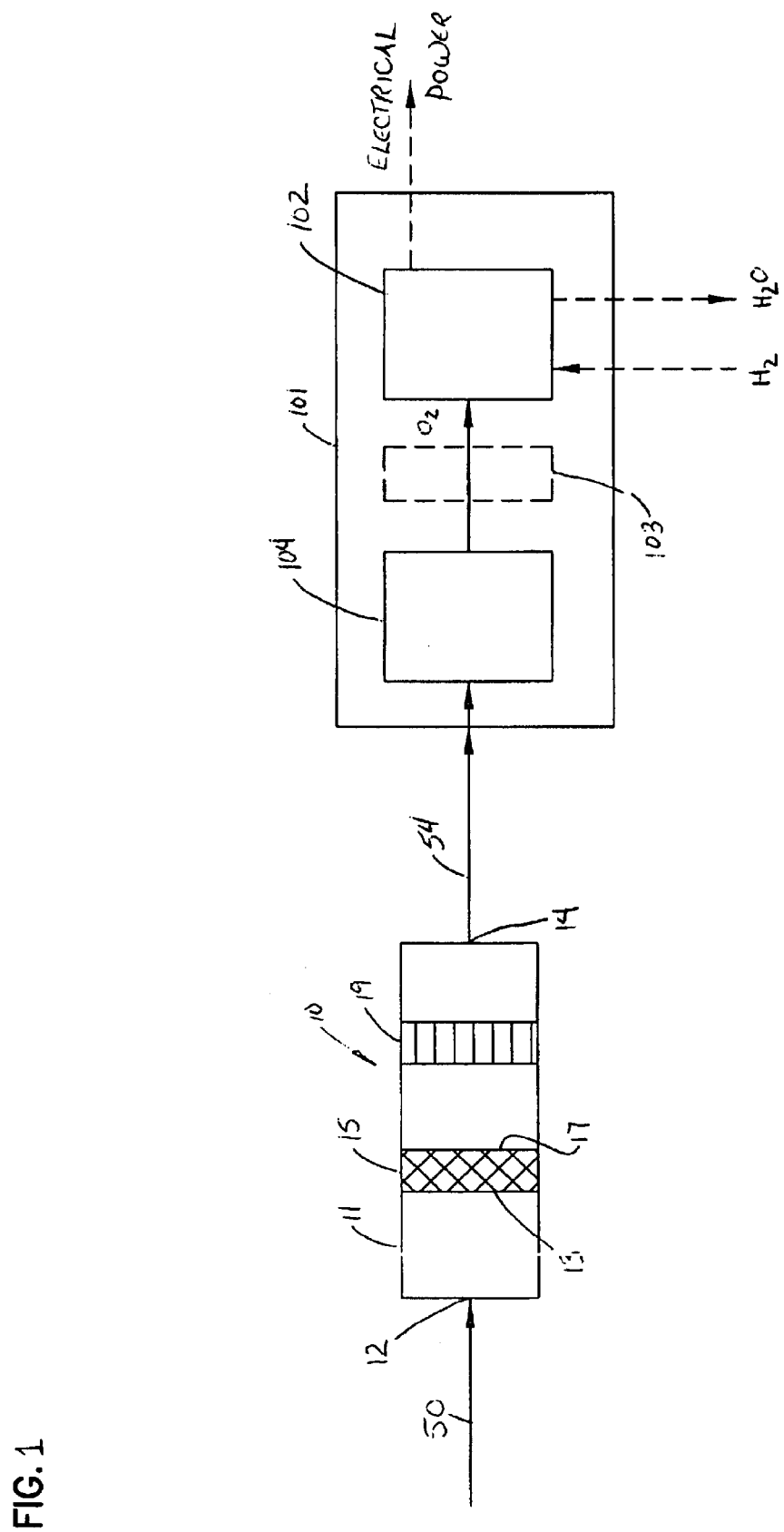
FIG. 1 is a schematic depiction of a power production system including a filter assembly of the present invention.

Referring to the figures, wherein like numerals represent like parts throughout the several views, there is schematically illustrated in FIG. 1, a filter assembly 10 is shown in combination with an assembly of equipment 101. One application for the filter assembly 10 of the present invention is to remove contaminants from air being used by equipment 101. Another application of filter assembly 10 is to suppress noise or sound produced by and/or emanating from equipment 101.

As depicted in FIG. 1, atmospheric or ambient air 50 enters and is received by filter assembly 10 via an inlet 12. Prior to entering filter assembly 10, atmospheric air 50 generally contains various physical (e.g., particulate) and chemical contaminants and will be generally referred to herein as dirty air. Filter assembly 10 is constructed to remove various contaminants from dirty air 50 to provide clean air 54 that exits from an outlet 14 of filter assembly 10. Clean air 54 is the intake air for equipment 101. In the embodiment depicted in FIG. 1, equipment 101 includes a fuel cell 102. Fuel cell 102 uses oxygen from the intake air 54, combined with a fuel source such as hydrogen ($H_2$) to generate power. Water ($H_2O$) is a by-product of the oxygen and hydrogen reaction that occurs within fuel cell 102.

Filter assembly 10 of the present invention has at least one filter element, schematically indicated at 15, for removing particulate and chemical contaminants. Filter element 15 has a dirty air intake side 13 and a clean air outlet side 17. A housing 11 retains filter element 15 therein. Inlet 12 is in fluid communication with dirty air intake side 13, and housing outlet is in fluid communication with clean air side 17 of filter element 15. Housing 11 maybe of varied configurations, and preferably comprises at least two sections, so that access can be gained to the contained filter element 15. The multiple sections can be held together by latches, clamps, straps, or other suitable securing mechanisms. One preferred system for engaging two housing sections of a filter assembly could be that system disclosed in U.S. Pat. No. 6,051,042 (Coulonvaux), which is incorporated herein by reference. Another preferred system is disclosed in U.S. Pat. No. 5,755,842 (Patel et al.), also incorporated herein by reference.

Atmospheric air 50 enters filter assembly 10 as dirty air through inlet 12 in housing 11 and progresses to dirty air side 13 of filter element 15. As the air passes through filter element 15 to its clean air side 17, contaminants are removed by filter element 15 to provide filtered air. The filtered air, illustrated at 54 exits filter assembly 10 through housing outlet 14 and is used by equipment 101. The type and extent of contaminants removed from the air to provide filtered air 54 depends on the contaminants present in atmospheric air 50 and the configuration of filter element 15.

Filter assembly 10 also includes a noise suppression element 19 to reduce or suppress the level of noise or sound emanating from equipment 101 and passing back through filter assembly 10. Suppression element 19 may be positioned within housing 11, and in some embodiments, suppression element 19 is defined by the configuration and shape of housing 11.

In order to facilitate or enhance the speed of the chemical reaction within a fuel cell, it is often desirable to introduce the oxygen bearing air 54 to the fuel cell under pressure, or at a faster rate than would be available by simple "exposure" of the fuel cell to air at atmospheric pressure. A compression or blower may be used for this purpose. Therefore, according to one configuration of the invention, equipment 101 includes a compressor 104 that provides air to fuel cell 102 to use in its catalytic reaction. Compressor 104 is positioned upstream from fuel cell 102. By the term "upstream", it is meant that air flows from compressor 104 to fuel cell 102; conversely, fuel cell 102 is positioned "downstream" from compressor 104. Filter assembly 10, which includes suppression element 19, is also positioned upstream from compressor 104.

Because of the fast moving impellers, rotors or pistons typically located within a compressor 104, compressor 104 emits noise while the frequency of such noise will vary depending on the type and configuration of the compressor, such noise is typically in the range of 3 Hertz to 30,000 Hertz, and sometimes as high as 50,000 Hertz, at a level of 85 to 110 dB at one meter. One particular type of compressor 104, a "Lysholm" twin screw compressor, available from Opcon Autorotor AB of Sweden, operates at and provides such noise output in the range of about 160 to 1100 Hertz.

Noise from compressor 104 travels in any direction possible, such as downstream to and through fuel cell 102 as well as upstream to and through filter assembly 10. Filter assembly 10, particularly by means of its suppression element 19, reduces the level of sound traveling upstream from compressor 104 and out of the filter assembly intake 12 by at least 3 dB at one meter, typically by at least 6 dB, and preferably by at least 25 dB. Various specific structures of filter assembly 10, including filter element 15 and noise suppression element 19, are described below.

A First Embodiment of a Filter Assembly

Figure 2:
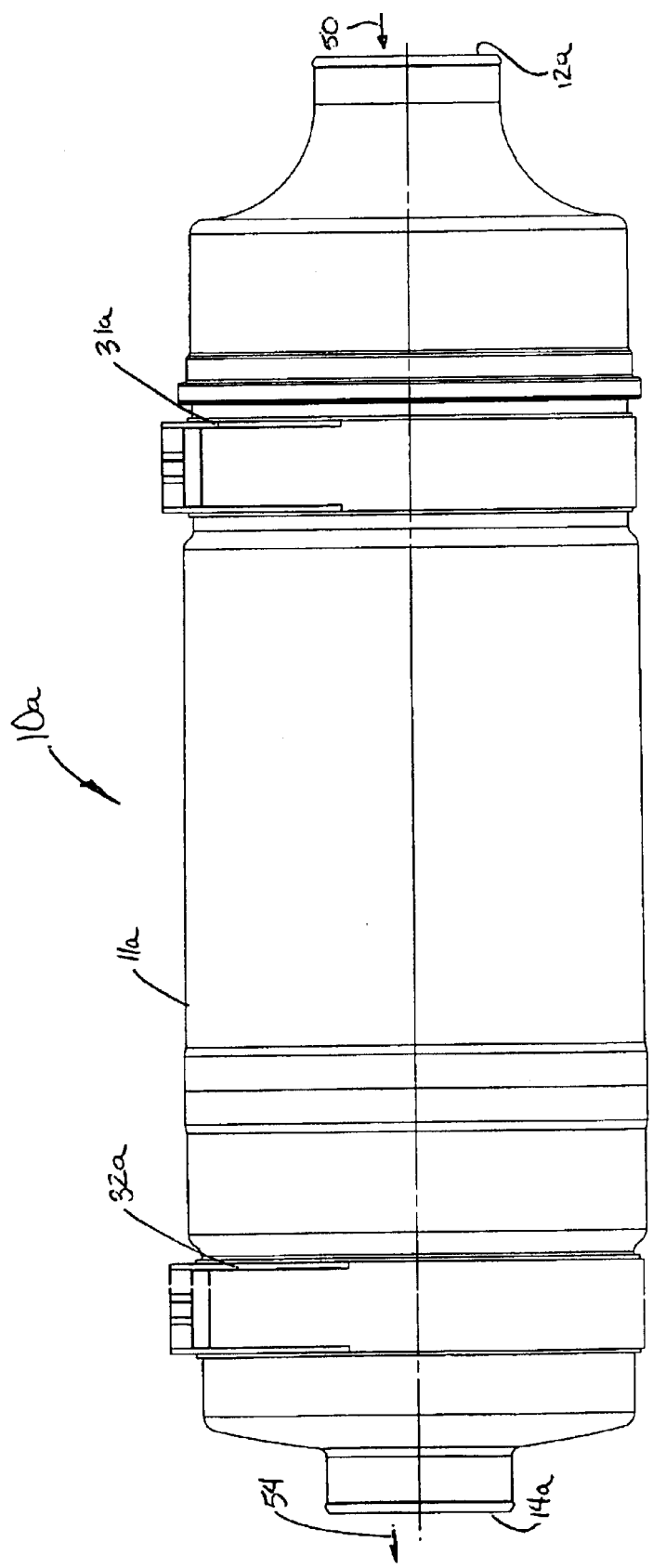
FIG. 2 is a front plan view of a first embodiment of the filter assembly of FIG. 1, configured according to the principles of the present invention.

A first example of a filter assembly configured according to the principles of this invention is shown in FIG. 2. For ease of identification, those elements in the embodiment of FIG. 2 that are the same or which perform the same function as comparable elements previously discussed with respect to the diagrammatic representation of FIG. 1 are followed by an alphabetic designation (i.e., "a") in FIG. 2. The same will be used when describing further embodiments, such as the embodiment of FIG. 12, wherein the reference numerals are followed by an alphabetic designation (i.e., "b").

Figure 3:
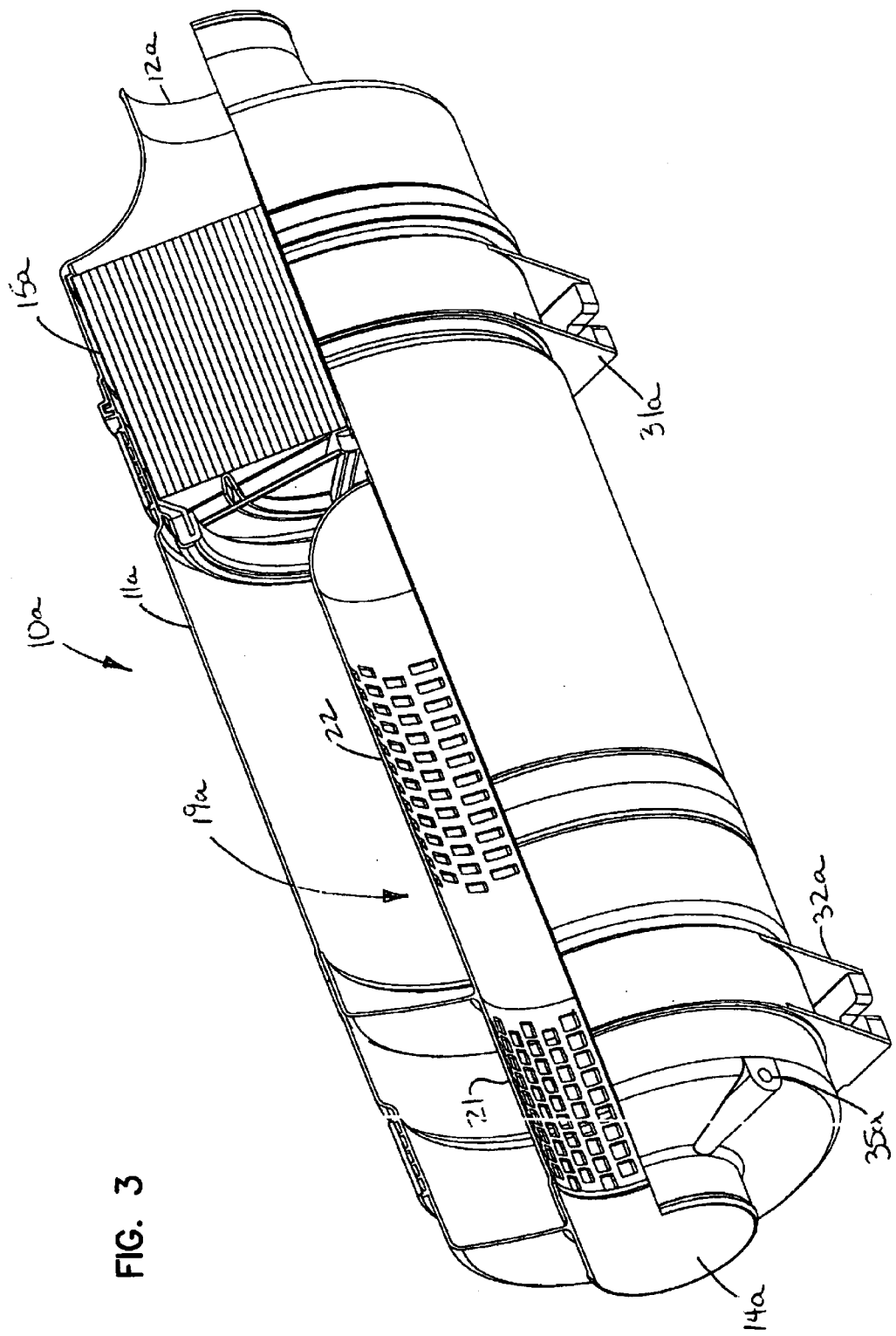
FIG. 3 is a fragmented cross-sectional perspective view of the filter assembly of FIG. 2.

FIGS. 2 and 3 illustrate a filter assembly 10a for use in a fuel cell operated passenger bus using a stack of fuel cells providing an overall power output of 200 kW. It should be understood that filter assembly 10a is specifically designed for such an application, i.e., a bus running on 200 kW, and that filter assemblies for other applications, such as other vehicles or stationary units, would be designed for those applications that are different in size, shape and configuration, without departing from the overall features of filter assembly 10a.

The filter assembly view of FIG. 2 is illustrated as rotated about its central longitudinal axis, with respect to the illustration of FIG. 3, by 180 degrees. Filter assembly 10a includes a generally cylindrical housing 11a which defines an air inlet 12a and an air outlet 14a. Dirty air 50 enters filter assembly 10a via inlet 12a, and clean air 54 exits via outlet 14a. The exterior of housing 11a may include mounting brackets 31a, 32a for positioning and securing filter assembly 10a in relation to surrounding equipment and structures. A sensor receptor port 35a is present on the exterior of housing 11a adjacent outlet 14a. Filter assembly 10a may assume any number of physical shapes other that cylindrical; for example, filter assembly 10a may have a cross-sectional shape that is oval or obround, square, rectangular, or any shape.

Housing 11a can be made from any material that can be formed with the desired elements, e.g., inlet 12a, outlet 14a, etc. Examples of usable materials for housing 11a include metals or plastics or other polymeric materials. Typically, housing 11a will be a thermoplastic or thermoset polymeric material, such as epoxy, polycarbonate, polyethylene, and the like. These materials may include reinforcement, such as a scrim or fibers, within the polymeric material to strength housing 11a. Preferably, no silicone mold release is used when making housing 11a or any other part or element of filter element 10a, as silicone fumes may be detrimental to the fuel cell.

Returning to the features of housing 11a, receptor port 35 is configured to cooperatively receive a sensor that can monitor parameters, as desired, within the housing internal cavity. One example of a sensor that may be desired for use within sensor receptor port 35a is an air mass flow sensor, generally referred to as a flow sensor or a flow meter. An air mass flow sensor can be used to monitor the mass of air passing through outlet 14a. The air mass passing through outlet 14a is directly related to the air mass passing through the entire system, including filter assembly 10a and equipment 101 of FIG. 1 (such as compressor 102, fuel cell 104, and optional exhaust apparatus 103). By monitoring any changes, specifically decreases, in air mass flow passing through filter assembly 10a, the life of any physical or particulate filter within filter assembly 10a or any other equipment in the system can be estimated. Alternately, a sensor can be used to monitor the level or accumulation of chemical contaminants that are passing through outlet 14a. By monitoring the amount of chemical contaminants passing through outlet 14a, the remaining life of any chemical filter within filter assembly 10a can be estimated.

One example of a preferred air mass flow sensor is a "hot wire" sensor, which uses the change in resistance through a wire to determine the amount of air passing over the wire. Such a hot wire sensor is available, for example, from TSI of St. Paul, Minn. Examples of devices that can monitor the accumulation or total contaminants include those disclosed in U.S. Pat. No. 5,976,467 and U.S. Pat. No. 6,187,596, both to Dallas et al. and incorporated herein by reference.

The various portions of filter assembly 10a are illustrated in FIG. 3, where a cut-away view of filter assembly 10a is provided. Operatively positioned within housing 11a are a filter element 15a and a noise suppression element 19a.

Suppression element is configured to attenuate sound waves passing through the internal cavity defined by housing 11a. In the preferred embodiment suppression element 19a comprises a first resonator 21 and a second resonator 22. First resonator 21 is configured to attenuate sound at a peak frequency of about 900 Hz, and second resonator 22 is configured to attenuate sound at a peak frequency of about 550 Hz. Detailed information regarding sound suppression element 19 (FIG. 1), suppression element 19a, and resonators 21, 22 hereinafter described in more detail.

Figure 4:
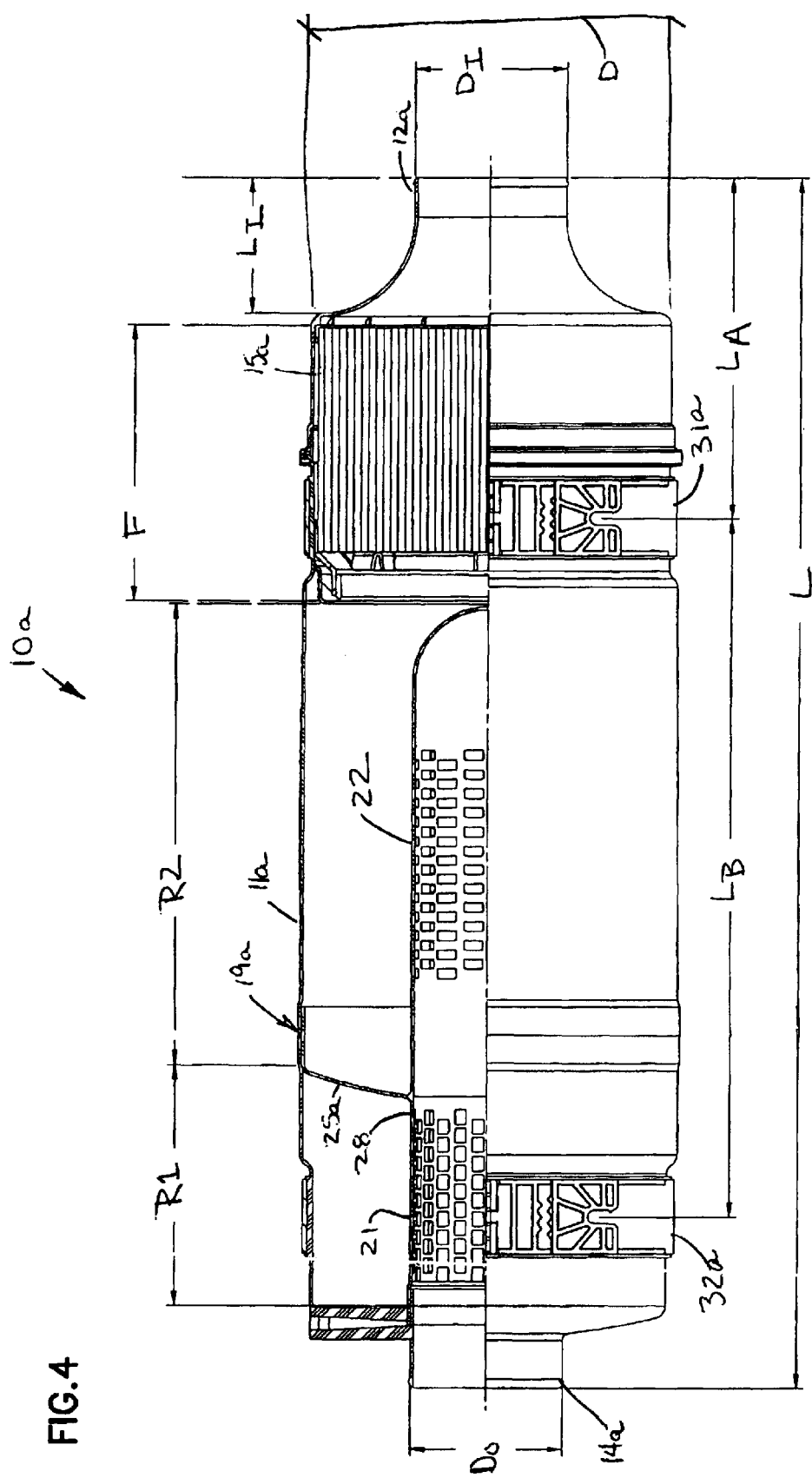
FIG. 4 is a fragmented cross-sectional front plan view of the filter assembly of FIG. 3.

Specific characteristics of a preferred configuration of the filter assembly 10a are illustrated in FIG. 4. Filter assembly 10a, specifically housing 11a, has a length "L" no greater than about 1500 mm, preferably no greater than about 1000 mm. In one preferred embodiment, length "L" is no greater than 32 inches (813 mm) long. Filter assembly 10a, which is generally cylindrical, has a diameter "D" no greater than about 18 inches (460 mm), preferably no greater than about 16 inches (406 mm). In the preferred embodiment, diameter "D" is no greater than 10 inches (254 mm). Length "L" and diameter "D" are generally dependent on the amount of volume allocated for occupation by filter assembly 10a within the system with which the filter assembly will be used. Such system requirements may be dictated by the space requirements of the application with which the system will be employed.

Air flows into filter assembly 10a via inlet 12a, which has a diameter "$D_I$" of about 1 to 8 inches (25 to 203 mm). In the preferred embodiment, inlet diameter "$D_I$" is about 4 inches (102 mm). The length of inlet 12a "$L_I$", measured as the distance from the inlet end of housing 11a to approximately the dirty air side of filter element 15a, is generally about 1 to 8 inches (25 to 203 mm). In the preferred embodiment, "$L_I$" is about 3.5 inches (90 mm). Outlet 14a has a diameter "$D_O$" of about 1 to 8 inches (25 to 203 mm). In the preferred embodiment, outlet diameter "$D_O$" is about 4 inches (102 mm).

Filter element 15a occupies a volume within housing 11a having a length "F" of about 4 to 8 inches (102 to 203 mm). The specific length "F" occupied by filter element 15a will be conditioned on features such as the type of filter element used, its filtering capabilities, the volume of housing 11a allotted to suppression element 19a (FIG. 3), and the overall length "L" of housing 11a. In the preferred embodiment, length "F" is about 7.3 inches (185 mm). Typically, the filter element 15a occupies the majority of the diameter D where filter element 15a is positioned.

Noise suppression element 19a occupies the majority of the remaining length of housing 11a. In the embodiment shown in FIGS. 3 and 4, suppression element 19a comprises a first resonator 21 and a second resonator 22. First resonator 21 occupies a length "$R_1$" of about 6.4 inches (163 mm) and second resonator 22 occupies a length "$R_2$" of about 12.2 inches (310 mm). The specific lengths $R_1$ and $R_2$ occupied by the resonators are a function of the desired sound attenuating properties of the resonator. That is, the frequency of the sound attenuated by the resonators is dependent on the configuration of the resonators, specifically, the volume occupied. As stated, additional information regarding sound attenuation and resonators is provided below.

Mounting brackets 31a, 32a on the exterior of filter assembly 10a are spaced apart 18.5 inches (470 mm), which is designated by "$L_B$". First mounting bracket 31a is spaced 8.9 inches (227 mm) from inlet 12a, designated by "$L_A$". It is understood that the positioning of any mounting brackets is dependant on the overall length "L" of filter assembly 10a, its desired positioning in respect to surrounding equipment or structures, and positioning of internal baffles or other structure within housing 11a.

Physical or Particulate Removal Portion of the Filter Assembly

Filter assembly 10 of the present invention, in particular filter element 15, includes a portion for removing physical contaminants such as particulates from the incoming air 50. It is understood that large items, such as leaves, birds, rodents and other debris, will be removed by a screen, mesh, separator or the like from incoming atmospheric air 50 prior to the air reaching filter assembly 10. A water or liquid separator may be included to remove water or fluid from air 50 prior to entering filter assembly 10 as is known in the art.

A series of particulate removal portions may be used within filter assembly 10, with each subsequent particulate removal portion removing a smaller sized particle. Alternately, a single particulate removal portion can be used.

Typically, the particulate removal portion contains a filter media, such as a fibrous mat or web, including cellulosic materials, to remove particles. Examples of particulates or particles removed by a particulate removal portion include dust, dirt, pollen, diesel particulate, insects, wood chips and sawdust, metal shavings, cosmic dust, and the like. Some particulates may be doubly harmful to the operation of the fuel cell, both as the physical particle and the molecular structure of the particle; for example, limestone, is a basic material that could harm the electrolyte in a PEM fuel cell, which is acidic. Other types of fuel cells may be detrimentally affected by acidic contaminants. Heavy hydrocarbons, particularly those found in road tar, can also detrimentally affect operation of a fuel cell.

The filter media can be treated in any number of ways to improve its efficiency in removing minute particulates; for example, electrostatically treated media can be used, as can cellulose or synthetic media or a combination thereof, having one or more layers of fine fiber, or other types of media known to those skilled in the art. For details regarding types of fine fiber that could be used, see for example, U.S. Pat. No. 4,650,506 (Barris et al.), which is incorporated herein by reference.

It is understood that any number of particulate removal portions having any combination of particulate removal efficiency can be used. The desired particulate removal system will depend on the type of contaminants present in the atmosphere (for example, leaves, cottonwood blossoms, lint, snow, cosmic dust, etc.) and the desired cleanliness level of the resulting filtered air. The media used in filter element 15 can vary, depending on the particulate removal efficiency desired, the maximum level of acceptable pressure drop through filter element 15, and other such factors.

Figure 5:
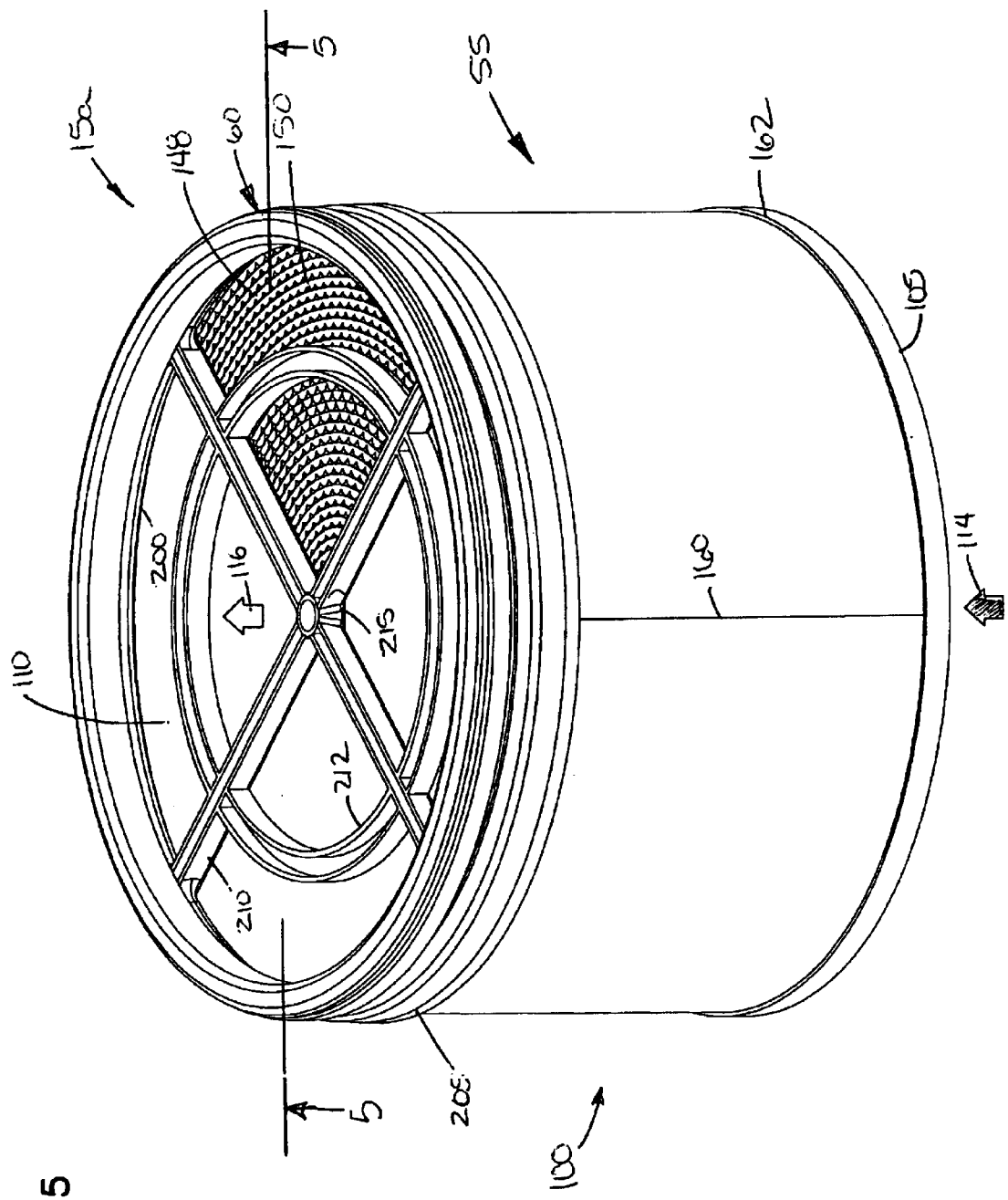
FIG. 5 is a perspective view of one embodiment of the filter element portion of the filter assembly of FIGS. 3 and 4, configured according to the principles of the present invention.

Filter element 15a of FIGS. 3 and 4 is illustrated in more detail in FIG. 5. In the preferred embodiment, filter element 15a includes filter media 55 that is wound about a central axis to form a cylindrically shaped filter element. The filter element includes a sealing system generally indicated at 60. One preferred sealing system is disclosed, for example, in U.S. Pat. No. 4,720,292, which is incorporated herein by reference.

In preferred constructions, filter media 55 is designed to remove particulate from air passing through the filter media 55, while the sealing system 60 is designed to provide a seal between filter element 15a and the interior sidewalls of housing 11a, as shown in FIGS. 3 and 4. By the term "seal," it is meant that sealing system 60, under normal conditions, prevents unintended levels of air from passing through a region between the outer surface of filter element 15a and the interior sidewall of housing 11a; that is, sealing system 60 inhibits air flow from avoiding passage through filtering media 55 of filter element 15a.

In certain preferred arrangements, filter media 55 is configured for straight-through flow. By "straight-through flow," it is meant that filter media 55 is configured so as to have a first flow face 105 (corresponding to an inlet end, in the illustrated embodiment) and an opposite, second flow face 110 (corresponding to an outlet end, in the illustrated embodiment). It is intended that there is no distinction between "straight-though flow" and "in-line flow". Air enters in one direction 114 through first flow face 105 and exits in the same direction 116 from second flow face 110. In this embodiment, first flow face 105 correlates to dirty air side 13 of the filter element of FIG. 1 and second flow face 110 correlates to clean air side 17 of the filter element of FIG. 1.

When filter element 15a is used with an inline-flow housing such as housing 11a of FIGS. 3 and 4, in general, the air will enter through inlet 12a of housing 11a in one direction, enter filter element 15a through first flow face 105 in the same direction, exit filter element 15a in the same direction from second flow face 110, and exit housing 11a through outlet 14a also in the same direction.

Although first flow face 105 is described above as corresponding to an inlet end (and dirty air side 13), and second flow face 110 is described above as corresponding to an outlet end (and clean air side 17), the inlet and outlet ends (and dirty air side and clean air side) can be reversed. That is, first flow face 105 depicted in FIG. 5 can correspond to an outlet end, while second flow face 110 depicted in FIG. 5 can correspond to an inlet end. In other words, the physical orientation of filter element 15a relative to the direction of air flow therethrough could be reversed.

In FIG. 5, first flow face 105 and second flow face 110 are depicted as planar and as parallel to one another. In other embodiments, first flow face 105 and second flow face 110 can be non-planar, for example, frusto-conical. Further, first flow face 105 and second flow face 110 need not be parallel to each other.

In the preferred embodiment, the media of filter element 15a is a wound construction. That is, filter element 15a will typically include a layer of filter media that is wound completely or repeatedly about a central axis. Typically, the wound construction will be a coil, in that a layer of filter media will be rolled a series of turns around a central axis. In arrangements where a wound, coiled construction is used, filter element 15a will be in the shape of a roll of filter media, typically permeable fluted filter media.

Figure 6:
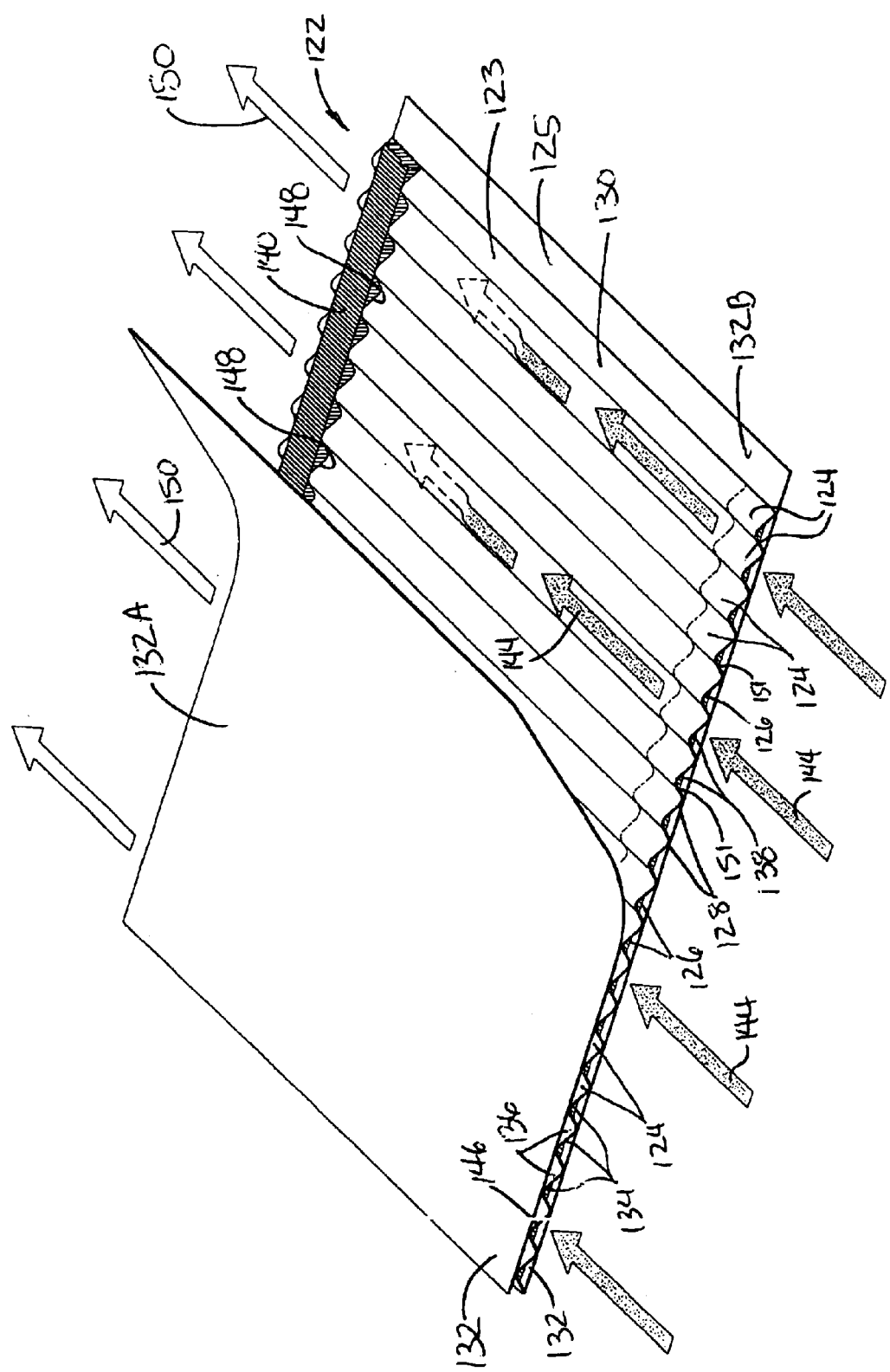
FIG. 6 is a schematic, perspective view of a portion of filter media usable in the filter element of FIG. 5.

Attention is now directed to FIG. 6, where a schematic, perspective view demonstrating the principles of operation of certain preferred media usable in the filter constructions herein is illustrated. In FIG. 6, a fluted media construction is generally designated at 122. Preferably, fluted construction 122 includes a layer 123 of corrugations having a plurality of flutes 124 and a face sheet 132. The FIG. 6 embodiment shows two sections of face sheet 132, at 132A (depicted on top of corrugated layer 123) and at 132B (depicted below corrugated layer 123). Typically, the preferred media construction 125 used in arrangements described herein will include corrugated layer 123 secured to bottom face sheet 132B. When using this media construction 125 in a rolled construction, it typically will be wound around itself, such that bottom face sheet 132B will cover the top of corrugated layer 123. Face sheet 132 covering the top of corrugated layer 123 is depicted as 132A. It should be understood that in a "rolled" media configuration face sheet 132A and 132B are the same sheet 132.

When using this type of media construction 125, flute chambers 124 preferably form alternating peaks 126 and troughs 128. Peaks 126 and troughs 128 divide flutes 124 into an upper row and lower row. In the particular configuration shown in FIG. 6, the upper flutes form flute chambers 136 closed at the downstream end, while flute chambers 134 having their upstream end closed form the lower row of flutes. Fluted chambers 134 are closed by a first end bead 138 that fills a portion of the upstream end of the flute between fluting sheet 130 and second facing sheet 132B. Similarly, a second end bead 140 closes the downstream end of alternating flutes 136. In some preferred systems, both first end bead 138 and second end bead 140 are straight along all portions of the media construction 125, never deviating from a straight path. In some preferred systems, first end bead 138 is both straight and never deviates from a position at or near one of the ends of media construction 125, while second end bead 140 is both straight and never deviates from a position at or near one of the ends of media construction 125. Flutes 124, face sheet 132, and end beads 138, 140 provide media construction 125 that can be formed into filter element 15a.

When using media constructed in the form of media construction 125, during use, unfiltered air enters flute chambers 136 as indicated by the shaded arrows 144. Flute chambers 136 have their upstream ends 146 open. The unfiltered fluid flow is not permitted to pass through downstream ends 148 of flute chambers 136 because their downstream ends 148 are closed by second end bead 140. Therefore, the air is forced to proceed through fluting sheet 130 or face sheets 132. As the unfiltered air passes through fluting sheet 130 or face sheets 132, the air is cleaned or filtered. The cleaned air is indicated by the unshaded arrow 150. The air then passes through flute chambers 134 (which have their upstream ends 151 closed) to flow through the open downstream end 152 (FIG. 5) out fluted construction 122. With the configuration shown, the unfiltered air can flow through fluted sheet 130, upper facing sheet 132A, or lower facing sheet 132B, and into a flute chamber 134.

Typically, media construction 125 will be prepared and then wound to form a rolled construction 100 of filter media. When this type of media is selected for use, media construction 125 includes corrugated layer 123 secured with end bead 138 to bottom face sheet 132B (as shown in FIG. 6, but without top face sheet 132A). In these types of arrangements, media construction 125 will include a leading edge at one end and a trailing edge at the opposite end, with a top lateral edge and a bottom lateral edge extending between the leading and trailing edges. By the term "leading edge", it is meant the edge that will be initially turned or rolled, such that it is at or adjacent to the center or core of the rolled construction. The "trailing edge" will be the edge on the outside of the rolled construction, upon completion of the turning or coiling process.

The leading edge and the trailing edge should be sealed between corrugated sheet 123 and bottom face sheet 132B, before winding the sheet into a coil, in these types of media constructions 125. While a number of ways are possible, in certain methods, the seal at the leading edge is formed as follows: (a) corrugated sheet 123 and bottom face sheet 132B are cut or sliced along a line or path extending from the top lateral edge to the bottom lateral edge (or, from the bottom lateral edge to the top lateral edge) along a flute 124 forming a peak 126 at the highest point (or apex) of peak 126; and (b) sealant is applied between bottom face sheet 132B and corrugated sheet 123 along the line or path of cut. The seal at the trailing edge can be formed analogously to the process of forming the seal at the leading edge. While a number of different types of sealant may be used for forming these seals, one usable material is a non-foamed sealant available from H. B. Fuller, St. Paul, Minn.

When using media construction 125, it may be desired by the system designer to wind the construction 125 into a rolled construction of filter media, such as filter element 15a of FIG. 5. A variety of ways can be used to coil or roll the media. It can be appreciated that non-round center winding members may be utilized for making other filtering media shapes, such as filter media having an oblong or obround, oval, rectangular, or racetrack-shaped profile.

Media construction 125 can also be wound without a mandrel or center core. One method of forming a coreless rolled construction is as follows: (a) troughs 128 of the first few corrugations of corrugated sheet 123 spaced from the leading edge are scored from the top lateral edge to the bottom lateral edge (or from the bottom lateral edge to the top lateral edge) to help in rolling construction 125; for example, the first four corrugations from the leading edge will have a score line cut along troughs 128; (b) bead 140 of sealant is applied along the top of corrugated sheet 123 along the lateral edge opposite from the lateral edge having end bead 138; (c) the leading edge is initially turned or rolled over against itself and then pinched together to be sealed with sealant bead 140; and (d) the remaining corrugated sheet 123 having bottom face sheet 132B secured thereto is coiled or rolled or turned around the pinched leading edge.

In other methods, coreless constructions can be made from media construction 125 by automated processes, as described in U.S. Pat. No. 5,543,007 and U.S. Pat. No. 5,435,870, each incorporated by reference herein. In still other methods, the media construction can be rolled by hand.

When using rolled constructions such as filter construction 100, the system designer will want to ensure that the outside periphery of construction 100 is closed or locked in place to prevent filter construction 100 from unwinding. There are a variety of ways to accomplish this. In some applications, the outside periphery is wrapped with a periphery layer. The periphery layer can be a non-porous, adhesive material, such as plastic with an adhesive on one side. When this type of layer is utilized, the periphery layer prevents filter construction 100 from unwinding and prevents air from passing through the outside periphery of filter construction 100, maintaining straight-through flow through filter construction 100.

In some applications, filter construction 100 is secured in its rolled construction by sealing the trailing edge of media construction 125 with an adhesive or sealant along a line 160 (FIG. 5) to secure the trailing edge to the outside surface of filter construction 100. For example, a bead of hot-melt may be applied along line 160.

Additionally or alternatively, a support band 162 can be provided around the outer perimeter of filter construction 100 to secure the trailing edge. In FIG. 5, support band 162 is shown positioned at first flow face 105.

Figure 7:
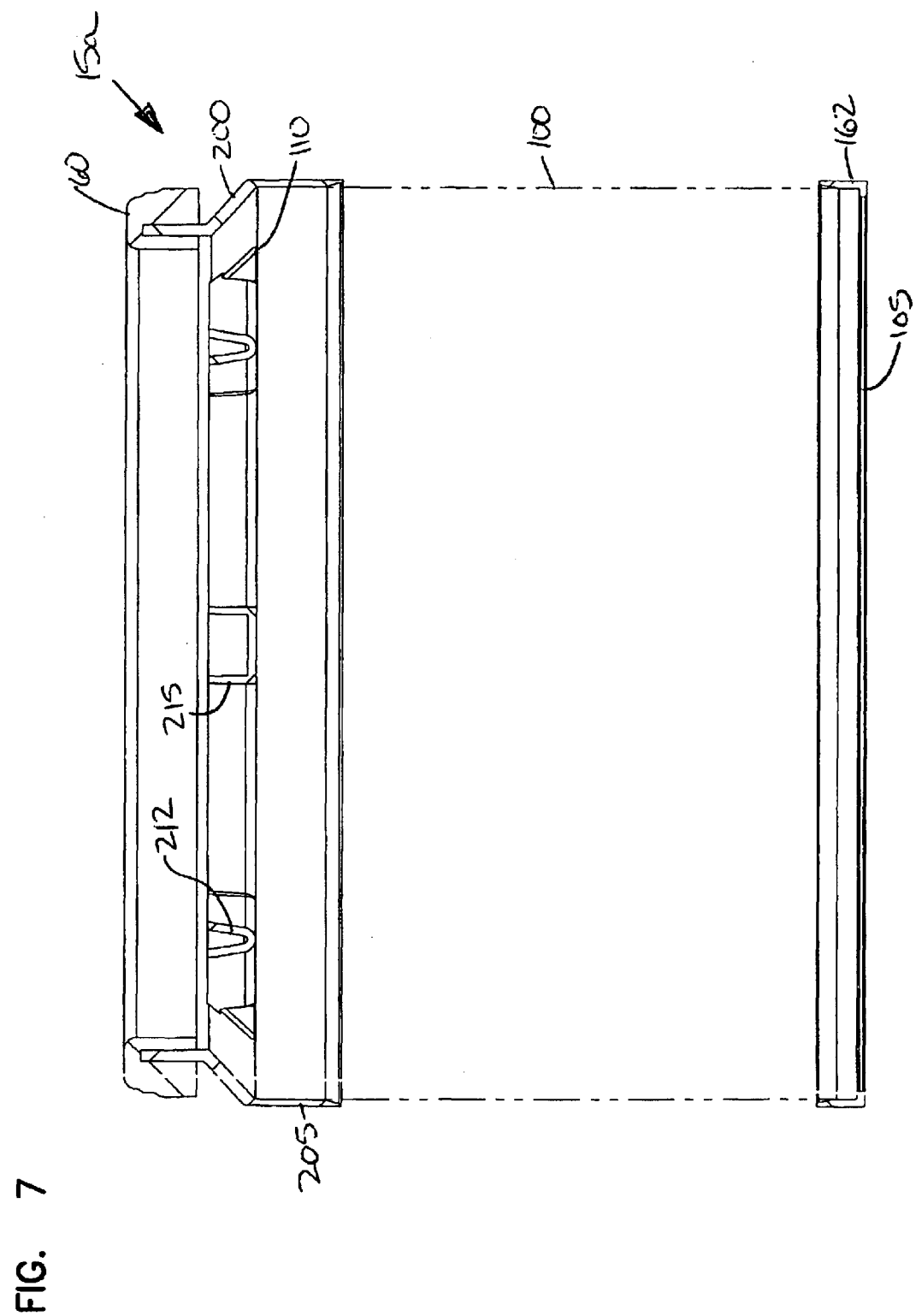
FIG. 7 is a fragmented cross-sectional view of the filter element of FIG. 5, taken along line 5—5 of FIG. 5.

Filter element 15a includes an end frame 200 positioned at second flow face 110. A cross-sectional fragmented view of filter element 15a is shown in FIG. 7; filter construction 100, with its various features, is shown in phantom. Referring to both FIGS. 5 and 7, frame 200 includes an outer annular peripheral band 205 and radial cross-braces 210. Cross-braces 210 extend inwardly from the outer peripheral band or collar 205 and meet at center 215 on the axis of the filter element. The crossbraces define an annular recessed seat portion when they meet at the center 215 of the frame 2000. Peripheral band 205 extends along the outer perimeter of filter construction 100 at second flow face 110 and extends longitudinally distally away from second flow face 110. In the particular embodiment shown in FIGS. 5 and 7, frame 200 includes a second inner annular ring 212 that intersects and connects to the cross-braces 210.

End frame 200 supports sealing system 60 and provides a solid, relatively non-deformable surface to facilitate the seal between the filter element and filter housing formed by sealing system 60. In particular, sealing system 60 comprises an annular ring of ground sealant material that is mounted to and seated on the distal portion of peripheral band 205 that projects outwardly from second flow face 110. Sealing system 60 is preferably a compressible material, such as a polyurethane foam material, that is configured to cooperatively engage the interior sidewalls of housing 11a and provide an air-tight seal. Sealing system 60 can have a stepped cross-sectional configuration of decreasing outermost diameter dimensions to facilitate sealing and to ensure a tight seal.

In general, for a properly functioning radially sealing structure, the compressible sealing system 60 needs to be compressed when filter element 15a is operatively mounted in housing 11a. In many preferred constructions, it is compressed about 15% to 40% (often about 20 to 33%) of its thickness, at the thickest portion thereof, to provide for a strong robust seal yet still be one that can result from hand installation of the element with forces on the order of 80 pounds or less, preferably 50 pounds or less, and generally from about 20–40 pounds.

Figure 8:
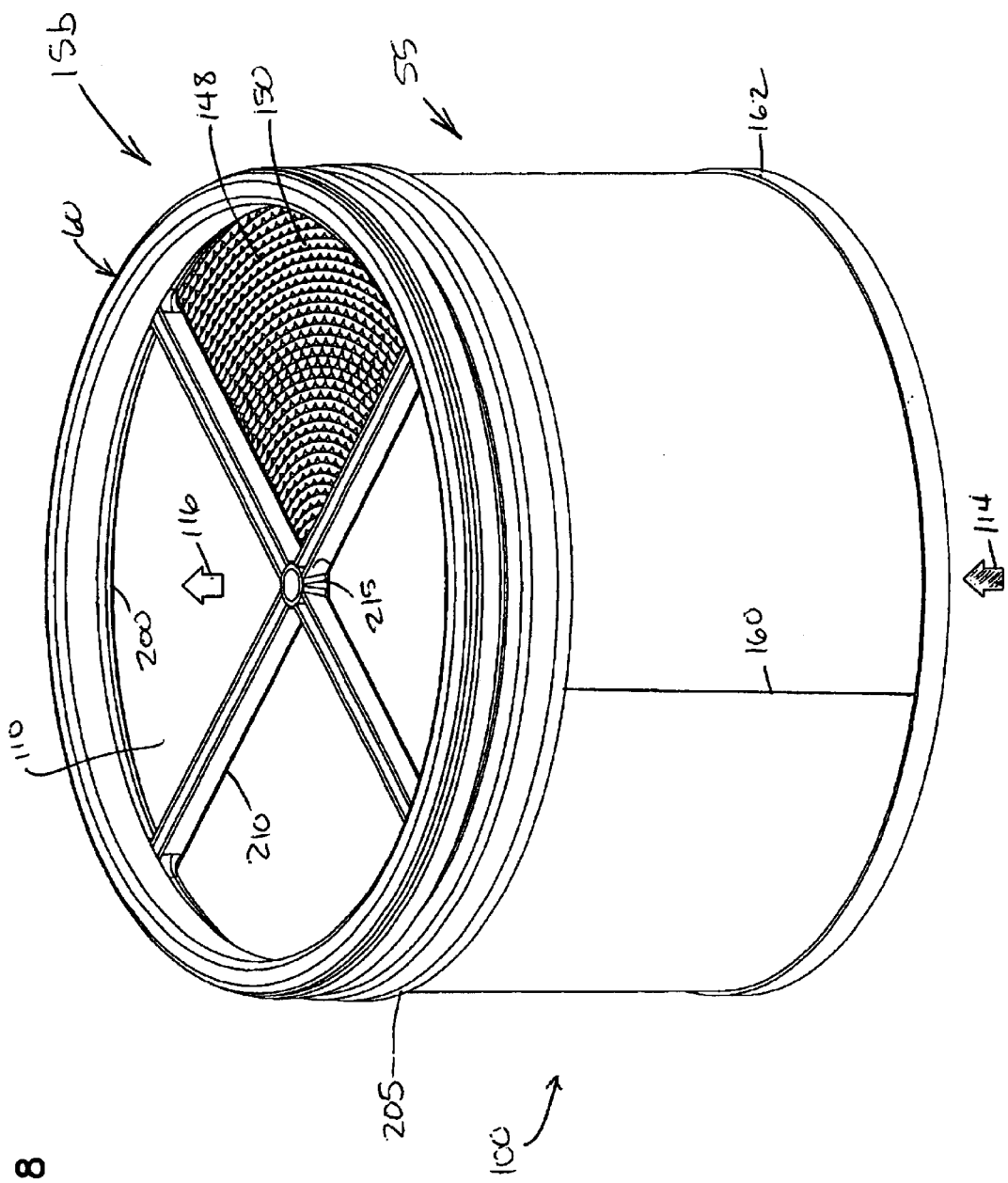
FIG. 8 is a perspective view of a second embodiment of a filter element, similar to that shown in FIG. 5, for use in the filter assembly of the present invention.

A second embodiment of a filter element for use in the filter assembly of the present invention is illustrated in FIG. 8 as filter element 15b. Filter element 15b is similar to filter element 15a of FIGS. 5 and 7, except that frame 200 of filter element 15b does not include inner annular ring 212.

Straight-Through Air Flow

Less Pressure Drop Than Compared to Conventional Pleated Filter Elements, Compact Size for More Particle Removal Additional details regarding filter element 15a, filter element 15b, and other usable filter elements can be found in U.S. Pat. No. 6,190,432, which is incorporated herein by reference.

It is understood that other filter constructions, other than those having straight-through flow, can be used. Examples of other particulate filter constructions that can be used include pleated media filters, panel filters, and the like.

A Chemical Removal Portion of the Filter Assembly

Referring again to FIG. 1, filter assembly 10 preferably also includes a portion designed to remove contaminants from the atmosphere by either adsorption or absorption. As used herein, the terms "adsorb", "adsorption", "adsorbent" and the like, are intended to also include the mechanisms of absorption and adsorption.

The chemical removal portion typically includes a physisorbent or chemisorbent material, such as, for example, desiccants (i.e., materials that adsorb or absorb water or water vapor) or materials that adsorb or absorb volatile organic compounds and/or acid gases and/or basic gases. The terms "adsorbent material," "adsorption material," "adsorptive material," "absorbent material," absorption material," absorptive material," and any variations thereof, are intended to cover any material that removes chemical contaminants by adsorption or absorption. Suitable adsorbent materials include, for example, activated carbon, activated carbon fibers, impregnated carbon, activated alumina, molecular sieves, ion-exchange resins, ion-exchange fibers, silica gel, alumina, and silica. Any of these materials can be combined with, coated with, or impregnated with materials such as potassium permanganate, calcium carbonate, potassium carbonate, sodium carbonate, calcium sulfate, citric acid, phosphoric acid, other acidic materials, or mixtures thereof. In some embodiments, the adsorbent material can be combined or impregnated with a second material.

The adsorbent material typically includes particulates or granulated material and can be present as granules, beads, fibers, fine powders, nanostructures, nanotubes, aerogels, or can be present as a coating on a base material such as a ceramic bead, monolithic structures, paper media, or metallic surface. Typically, the adsorbent materials, especially particulate or granulated materials, are provided as a bed of material.

Alternately, the adsorbent material can be shaped into a monolithic or unitary form, such as a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process. Shaped adsorbent articles are taught, for example, in U.S. Pat. No. 5,189,092 (Koslow), and U.S. Pat. No. 5,331,037 (Koslow), which are incorporated herein by reference.

The binder used for providing shaped articles can be dry, that is, in powdered and/or granular form, or the binder can be a liquid, solvated, or dispersed binder. Certain binders, such as moisture curable urethanes and materials typically referred to as "hot melts", can be applied directly to the adsorbent material by a spray process. In some embodiments, a temporary liquid binder, including a solvent or dispersant which can be removed during the molding process, is used. Suitable binders include, for example, latex, microcrystalline cellulose, polyvinyl alcohol, ethylene-vinyl acetate, starch, carboxyl methyl cellulose, polyvinylpyrrolidone, dicalcium phosphate dihydrate, and sodium silicate. Preferably the composition of a shaped material includes at least about 70%, by weight, and typically not more than about 98%, by weight, adsorbent material. In some instances, the shaped adsorbent includes 85 to 95%, preferably, approximately 90%, by weight, adsorbent material. The shaped adsorbent typically includes not less than about 2%, by weight, binder and not more than about 30%, by weight, binder.

Another embodiment of a suitable adsorbent material for use in the chemical removal portion is an adsorbent material that includes a carrier. For example, a mesh or scrim can be used to hold the adsorbent material and binder. Polyester and other suitable materials can be used as the mesh or scrim. Typically, any carrier is not more than about 50% of the weight of the adsorbent material, and is more often about 20 to 40% of the total adsorbent weight. The amount of binder in the shaped adsorbed article with the carrier typically ranges about 10 to 50% of the total adsorbent weight and the amount of adsorbent material typically ranges about 20 to 60% of the total adsorbent weight.

The chemical removal portion can include strongly basic materials for the removal of acid contaminants from the air, or strongly acidic materials for the removal of basic contaminants from the air, or both. Preferably, the basic materials and acidic materials are sufficiently separated from each other so that they do not interact with or cancel each other. In some embodiments, the adsorbent material itself may be the strongly acidic or strong basic material. Examples of such materials include materials such as polymer particulates, activated carbon media, zeolites, clays, silica gels, and metal oxides. In other embodiments, the strongly acidic materials and the strongly basic materials can be provided as surface coatings on carriers such as granular particulate, beads, fibers, cellulosic material, fine powders, nanotubes, and aerogels. Alternately or additionally, the acidic and basic material that forms the acidic and basic surfaces may be present throughout at least a portion of the carrier; this can be done, for example, by coating or impregnating the carrier material with the acidic or basic material.

Examples of acidic compounds that are often present in atmospheric air and are considered as contaminants for fuel cells include sulfur oxides, nitrogen oxides, hydrogen sulfide, hydrogen chloride, and volatile organic acids and nonvolatile organic acids. Examples of basic compounds that are often present in atmospheric air and are considered as contaminants for fuel cells include ammonia, amines, amides, sodium hydroxides, lithium hydroxides, potassium hydroxides, volatile organic bases and nonvolatile organic bases.

For PEM fuel cells, the cathodic reaction occurs under acidic conditions, thus, it is undesirable to have basic contaminants present. An example of a preferred material for removing basic contaminants, such as ammonia, is activated carbon impregnated or coated with citric acid.

Figure 9:
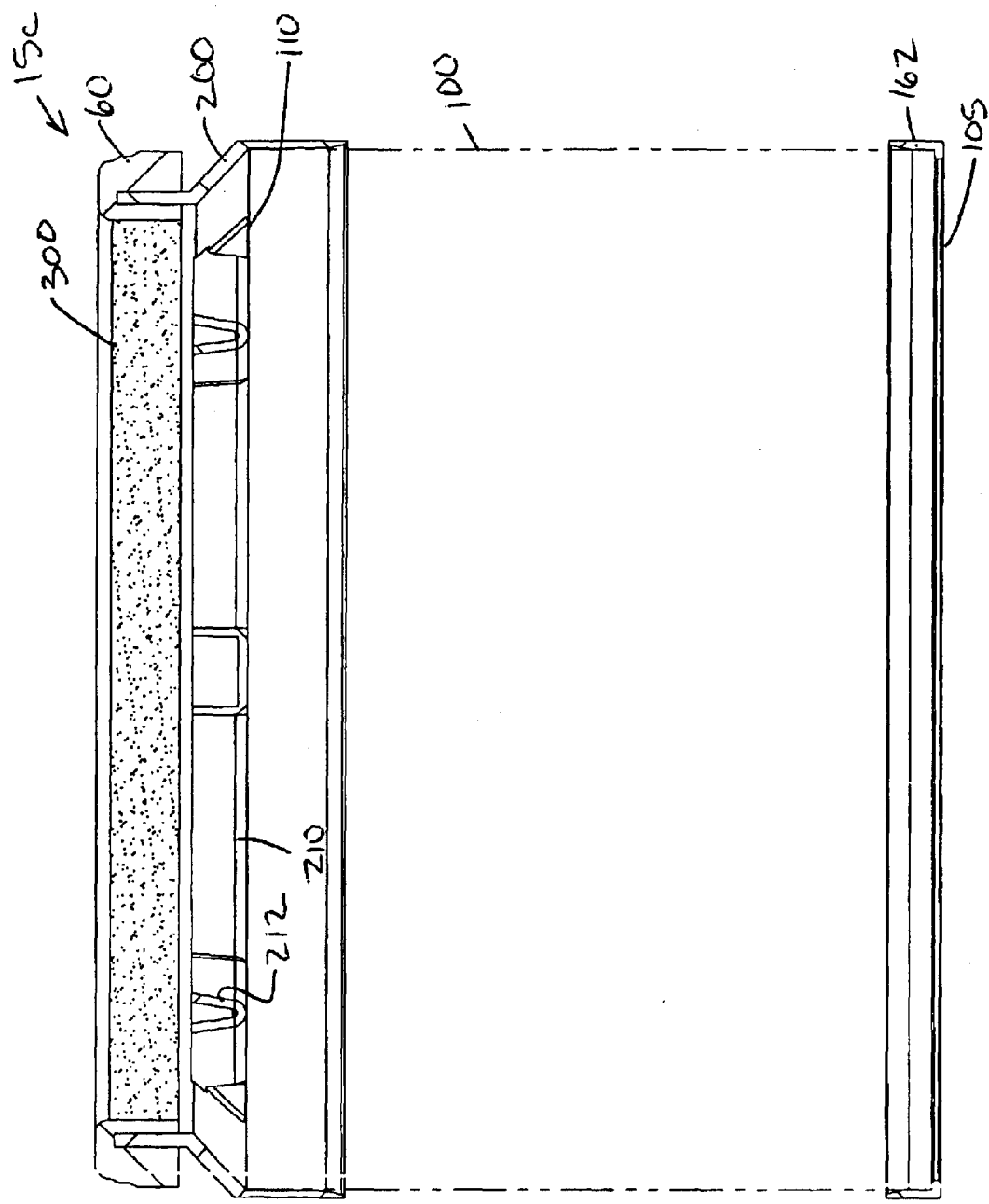
FIG. 9 is a fragmented cross-sectional view of a third embodiment of a filter element, similar to that shown in FIG. 7, for use in the filter assembly of the present invention.

A first embodiment of a filter element 15 (FIG. 1) having both the physical or particulate removal portion and a chemical removal portion is shown in FIG. 9 as filter element 15c. Filter element 15c is similar to filter element 15a of FIG. 7 in that filter element 15c has filter construction 100 (shown in phantom in FIG. 9) with first flow face 105 and second flow face 110, support band 162, frame 200, and sealing system 60. Filter element 15c further includes an adsorbent 300, such as shaped activated carbon. Adsorbent 300 is positioned on frame 200 within frame 200 and sealing system 60. The compressible sealing system 60 frictionally retains adsorbent 300 in the desired position, but can be deformed to release adsorbent 300 for replacement when the adsorbent is spent.

In a preferred embodiment, adsorbent 300 is a shaped mass of activated carbon material held together by a thermoplastic binder. A preferred adsorbent 300 includes activated carbon material, sieve size 12×20 or 8×16, molded with a level of 8% ethylene-vinyl acetate binder. Such a preferred adsorbent 300 can be made in accordance with the teachings of U.S. Pat. No. 5,189,092 (Koslow), and U.S. Pat. No. 5,331,037 (Koslow). In another preferred embodiment, adsorbent 300 is made from layers (not shown) of carbon material available from Hollingsworth & Vose of East Walpole, Mass. (also known as H & V).

In the embodiment shown, adsorbent 300 is positioned adjacent second flow face 110; thus air flowing through filter element 15c would enter filter construction 100 via first flow face 105 and exit via second flow face 110, and then pass through adsorbent 300. Such a configuration has adsorbent 300 "downstream" of the particulate removing filter construction 100. All air passing through filter construction 100 preferably passes through adsorbent 300. It is understood that adsorbent 300 could alternatively be positioned "upstream" from filter construction 100.

Figure 10:
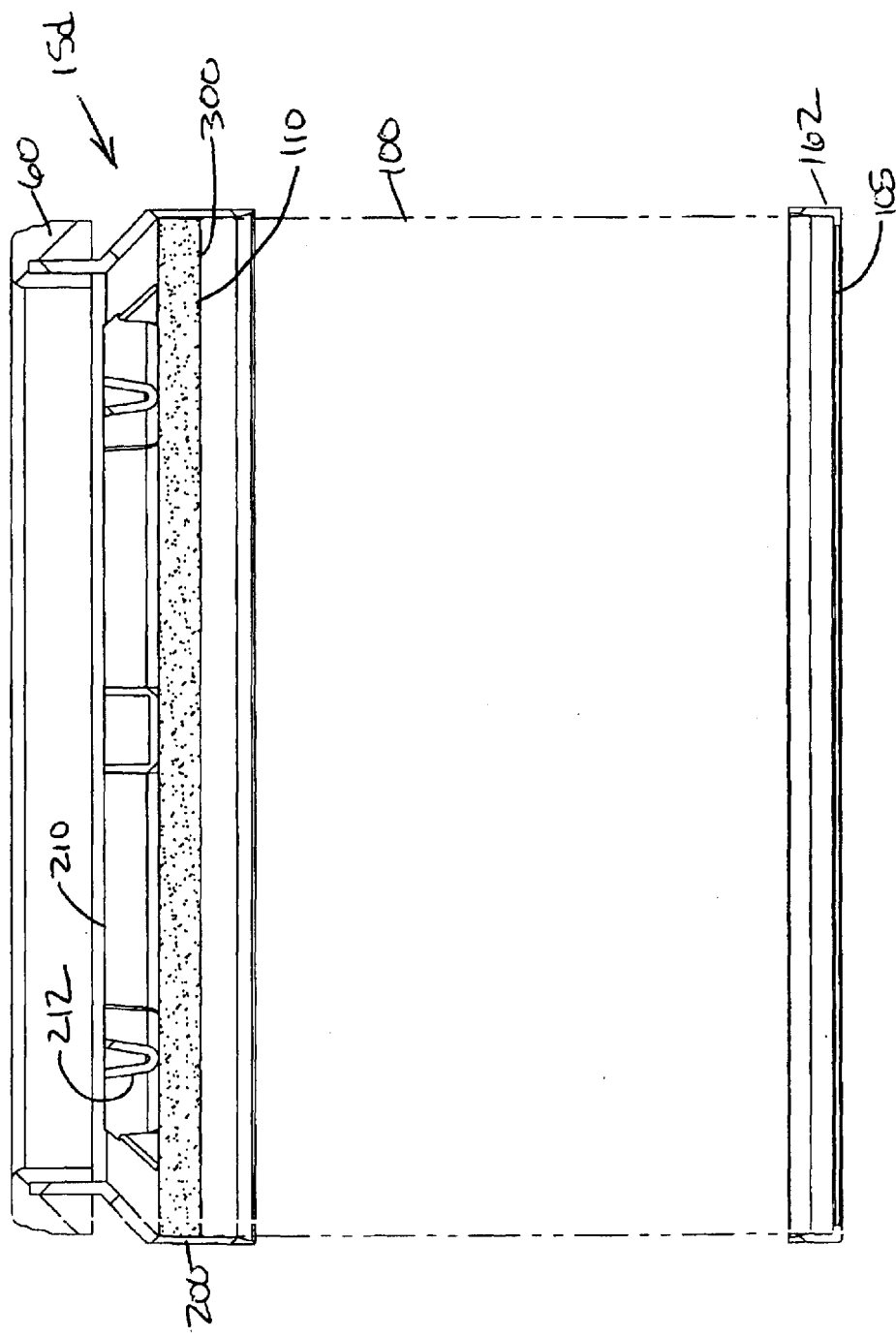
FIG. 10 is a fragmented cross-sectional view of a fourth embodiment of a filter element, similar to that shown in FIGS. 7 and 9, for use in the filter assembly of the present invention.

A second embodiment of a filter element 15 (FIG. 1) having both the physical or particulate removal portion and a chemical removal portion is shown in FIG. 10 as filter element 15d. Filter element 15d is similar to filter element 15a in that filter element 15d has filter construction 100 (shown in phantom) with first flow face 105 and second flow face 110, support band 162, frame 200, and sealing system 60. Filter element 15d further includes the adsorbent 300, except that adsorbent 300 is positioned between second flow face 110 and cross-braces 210 of frame 200. Peripheral band 205 of frame 200 holds adsorbent 300 against second flow face 110. Adsorbent 300 may be permanently affixed to one or each of frame 200 and filter construction 100, or may be disengageable therefrom. Again, all air passing through second flow face 110 of filter construction 100 preferably also passes through adsorbent 300.

In filter elements 15c and 15d, the chemical removal portion, specifically adsorbent 300, has been combined with the particulate removal portion to form a single structure. It is understood that in some embodiments, the chemical removal portion will be separate and spaced from the particulate removal portion. It is further understood that the particulate removal portion and chemical removal portion can be combined in a single element that removes both physical and chemical contaminants. In one example, the filter media of a particulate removal portion can be made with fibers that have a surface treatment capable of chemisorbing or otherwise reacting or interacting with acidic or basic contaminants, thus providing a chemical removal portion. In another example, a bed of activated carbon granules can be arranged and configured to remove physical contaminants from the air if the spacing between the granules is sufficiently small.

One preferred filter element that includes both particulate and chemical removal portion is disclosed in U.S. Pat. No. 6,152,996 (Linnersten et al.), which is incorporated herein by reference.

Additional information regarding chemical removal portions of filter elements for use with fuel cell systems is disclosed in U.S. patent application Ser. No. 09/660,127, filed Sep. 12, 2000 and incorporated herein by reference in its entirety.

A Sound Suppression Element of the Filter Assembly

Referring again to FIG. 1, filter assembly 10 of the present invention includes a noise or sound suppression element 19 to reduce or suppress the level of noise or sound emanating from equipment 101. Such noise reduction is preferably at least 3 dB at one meter, typically at least 6 dB, preferably at least 10 dB, and most preferably at least 25 dB. The catalytic reaction occurring within fuel cell 102 is a silent process, in that the hydrogen fuel, the reaction at the cathode, and the production of power, produce no sound audible by humans. Details regarding the construction and operation of fuel cells 102 are provided below. However, although fuel cell 102 is silent, the equipment or machinery often used to provide an increased flow of air to fuel cell 102, such as compressor 104 of FIG. 1, generally produce significant noise. Air moving equipment that may be used in conjunction with fuel cell 102 includes compressors, fans, blowers, and pumps.

Sound emanating from equipment such as compressor 104 will travel in any direction as permitted by the fuel cell, equipment and filter assemblies. That is, sound would travel upstream from the compressor, against the flow of the air, to filter assembly 10; and sound would travel downstream to fuel cell 102. In accordance with the present invention, filter assembly 10 reduces the noise emanating from compressor 104 through the filter assembly and out to the surrounding environment, by attenuating the sound with sound suppression element 19 of filter assembly 10.

Sound suppression element 19 can be any type of element that provides, together with all features of filter assembly 10, reduction in the sound by at least 3 dB, typically at least 6 dB, preferably by at least 10 dB, and more preferably by at least 25 dB. Examples of sound suppression elements 19 include mufflers, lined ducts, baffles, bends in the sound path, plenums, expansion chambers, resonators, sonic chokes, full chokes, sound adsorptive material, and various combinations thereof. Various details regarding sound suppression elements are disclosed, for example, in U.S. Pat. No. 6,082,487 (Angelo et al.), which in incorporated herein by reference.

Certain typical suppression elements 19 include an outer wall, usually cylindrical, defining an internal volume, and an inlet and outlet tube oriented within the internal volume of the outer wall. It is preferred that the outer wall and any other structures have minimal surfaces that are planar or flat; rather, it is preferred that the surfaces of suppression element 19 are curved, to reduce the amount of vibration or drumming that often occurs with flat walls. In typical arrangements, the outlet tube defines a sonic choke. An inner, perforated wall is spaced from the outer wall, to define an annular volume therebetween. The annular volume may include a packing or padding of absorptive material within the annular volume. This absorptive material within the annular volume provides an absorptive function, and also helps reduce drumming of the outer wall or shell. In certain arrangements, the inner perforated wall and annular volume are in alignment with the inlet region of suppression element 19. That is, the inner perforated wall may circumscribe at least a portion of the inlet tube.

A preferred suppression element 19 is a resonator. A resonator is an enclosed volume of air in communication with the exterior through a small opening. The enclosed air resonates at a finite range of frequency. The range of frequency and the level of attenuation depend on the dimensions of the volume. The frequency resonated within the resonator volume directs the noise frequency attenuated by the resonator.

In filter assembly 10*a* illustrated in FIGS. 3 and 4, suppression element 19*a* comprises first resonator 21 and second resonator 22. Notice that first resonator 21 is positioned adjacent outlet 14*a* and second resonator 22 is positioned upstream or closer to inlet 12*a* such designated "first" and "second" positioning of the resonators has been selected because noise from equipment 101 (FIG. 1) would be moving upstream (opposite to the direction of air flow) through filter assembly 10*a* from outlet 14*a* to inlet 12*a*. First and second resonators 21, 22 can be designed to attenuate the same or a different range of sound frequencies. Generally, if resonators 21, 22 remove the same range of noise frequency, the level of noise decrease will be greater. If resonators 21, 22 remove noise of different frequency ranges, the overall ranges of frequencies attenuated will be greater.

In one preferred embodiment, first resonator 21 is designed to attenuate sound at a peak frequency of about 900 Hz, and second resonator 22 is designed to attenuate sound waves at a peak frequency of about 550 Hz. As illustrated in FIGS. 3 and 4, various features differ between first resonator 21 and second resonator 22. For example, the volume occupied by second resonator 22 is much greater that that occupied by first resonator 21. The volume of first resonator 21 is generally defined by the interior walls of housing 11*a* between outlet 14*a* and an internal baffle 25*a*. The volume occupied by second resonator 22 is generally defined by the interior walls of housing 11*a* between internal baffle 25*a* and flow face 110 of the filter element. Additionally, the perforations within a central wall structure 28 vary between first resonator 21 and second resonator 22. For example, the shape and size of the apertures, the spacing between adjacent apertures, and their orientation differ between the two resonators. These various features of each resonator dictate the frequencies attenuated thereby. Design of resonators for desired frequency attenuation is well known in the art of sound suppression and attenuation and will not be detailed herein.

Additionally, first and second resonators 21, 22 are spaced approximately 3 inches (76 mm) apart, as measured by the longitudinal spacing between the perforations in central wall structure 28 of the two resonators. This distance between resonators 21, 22, designated at 24, will attenuate sound having a frequency whose ¼ wavelength is equal to this distance. A distance of approximately 3 inches (76 mm) provides a peak attenuation of 1100 Hz.

Figure 11:
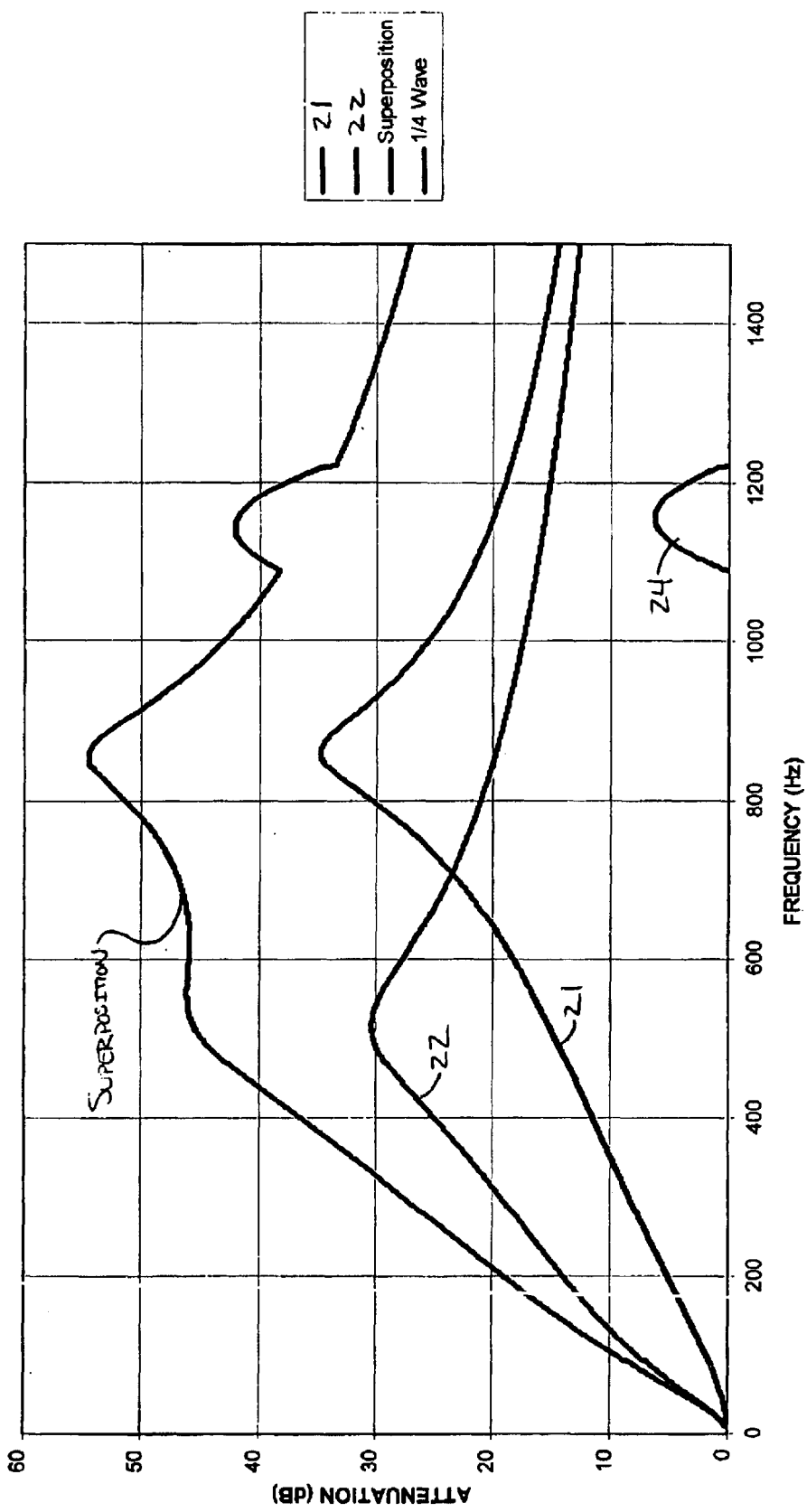
FIG. 11 is a graphical representation of sound attenuation versus frequency for the filter assembly of FIGS. 3 and 4.

FIG. 11 graphically illustrates the levels and frequencies attenuated by the preferred embodiment described above, where first resonator 21 attenuates sound at a peak frequency of about 900 Hz, second resonator 22 attenuates sound at a peak frequency of about 550 Hz, and the ¼ wavelength spacing 24 attenuates sound at about 1100 Hz. The composite sound attenuation of the three spans the fundamental frequencies of a typically twin-screw compressor.

Referring again to FIG. 1, suppression element 19 may be positioned within housing 11, and in some embodiments, suppression element 19 is defined by housing 11. In the embodiment of filter assembly 10*a*, first and second resonators 21, 22 are partially defined by housing 11*a*. The interior walls of housing 11*a* together with internal baffle 25, define the volume occupied by resonators 21, 22.

Various other features of housing 11*a* may provide sound attenuation. For example, inlet 12*a*, as illustrated in FIG. 4, has a bell shaped expansion in the axial direction from a 4 inch (102 mm) to 10 inch (254 mm) diameter. This expansion provides a broadband sound attenuation of approximately 3 dB.

It is noted that filter element 15, such as any of filter elements 15*a*, 15*b*, 15*c*, 15*d*, may have additional sound attenuation properties associated with the particulate removal portion or the chemical removal portion. For example, filter construction 100 (FIGS. 5 and 7), may attenuate some frequencies at a low amount such as 1 dB. Additionally, adsorbent 300 (FIGS. 9 and 10) may attenuate some frequencies. It has been found that various shaped adsorbent elements, such as those taught by U.S. Pat. No. 5,189,092 (Koslow), and U.S. Pat. No. 5,331,037 (Koslow), provide some sound attenuation; the frequency attenuated and the level (i.e., dB) will depend on the specific features of the shaped adsorbent element.

A Second Embodiment of a Filter Assembly

Figure 12:
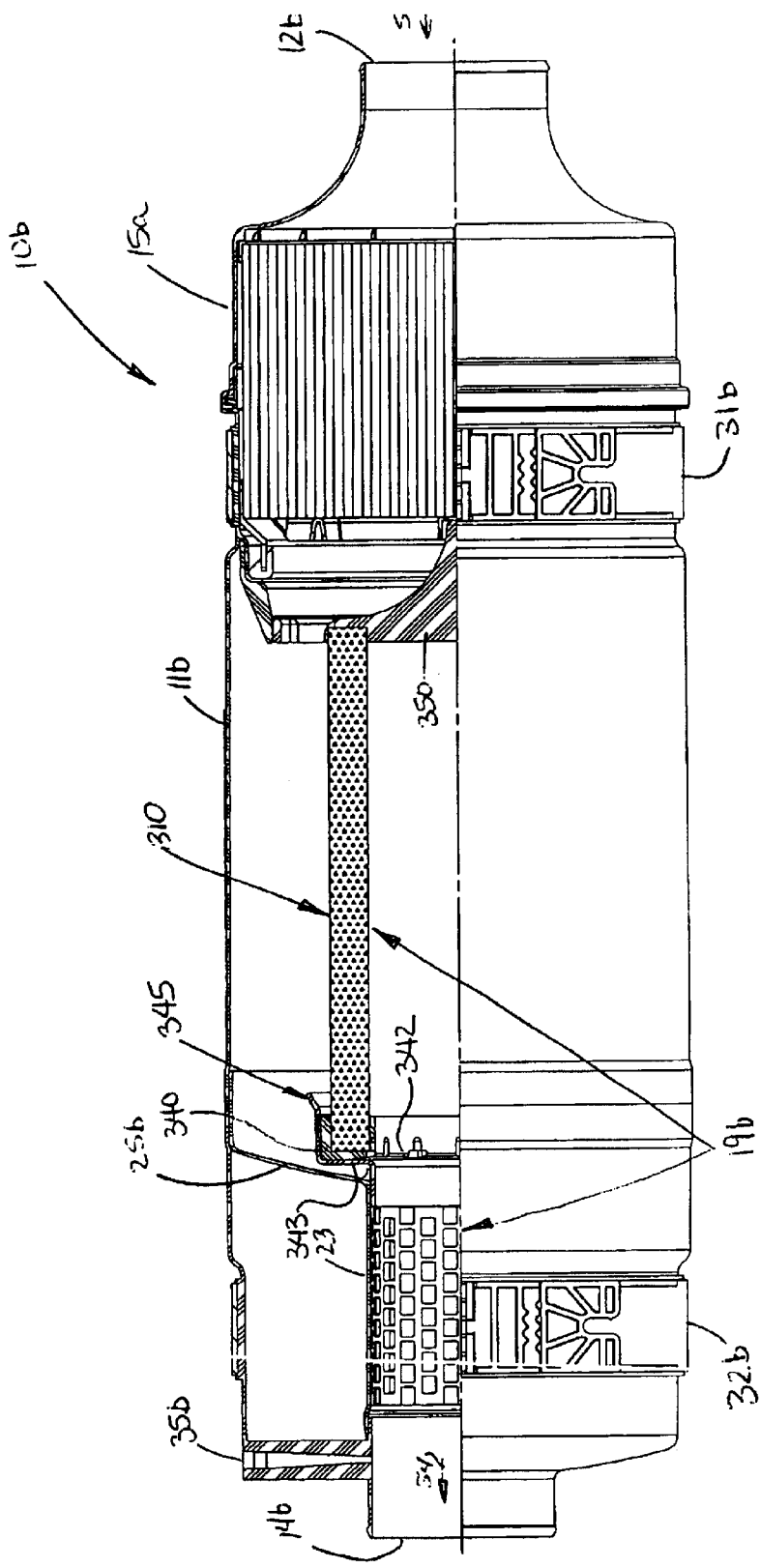
FIG. 12 is a fragmented cross-sectional front plan view of a second embodiment of a filter assembly having an external configuration of the filter assembly of FIG. 1.

A second example of a filter assembly is shown in fragmented cross-section in FIG. 12 as a filter assembly 10*b*. Similar to filter assembly 10*a*, filter assembly 10*b* is for use in a fuel cell operated passenger bus using a stack of fuel cells providing an overall power output of 200 kW. It should be understood that filter assembly 10*b* is specifically designed for such an application, (i.e., a bus running on 200 kW), and that filter assemblies for other applications would be designed for those applications that are different in size, shape and configuration, without departing from the overall features of filter assembly 10*b*.

Filter assembly 10*b* includes a housing 11*b* which defines an inlet 12*b* and an outlet 14*b*. Dirty air 50 enters filter assembly 10*b* via inlet 12*b*, and clean air 54 exits via outlet 14*b*. The exterior of housing 11*b* includes mounting brackets 31*b*, 32*b* for positioning and securing filter assembly 10*b* in relation to surrounding equipment and structures. A sensor receptor port 35*b* is present on the exterior of housing 11*b* to allow for connection of a sensor, as may be desired. Filter element 15*a* is positioned within housing 11*b*. In filter assembly 10*b* of this embodiment, the filter element 15*a* used is the same as filter element 15*a* of filter assembly 10*a* of the first embodiment. Also within housing 11*b* is a noise suppression element 19*b*.

Suppression element 19*b* comprises a resonator 23 configured to attenuate sound at a peak of about 900 Hz. Detailed information regarding resonators is provided above with respect to the first embodiment of filter assembly 10*a*. Resonator 23 has one end operatively connected in fluid communication with the outlet port 14*b* of the filter assembly, and an opposite end to which is secured an annular mounting bracket 342. Mounting bracket 342 has a perforated central portion allowing air to pass therethrough into resonator 23, and defines an annular seal seat 343 that includes a cylindrical extension flange 345 axially projecting away from resonator 23 in a direction toward inlet port 12b. The distal end of flange 345 is outwardly flared to help guide an adsorbent element 310 into sealing engagement. In an alternate embodiment, a mounting bracket could be used that has a seal seat positioned internally positioned in relation to adsorbent element 310.

Figure 13:
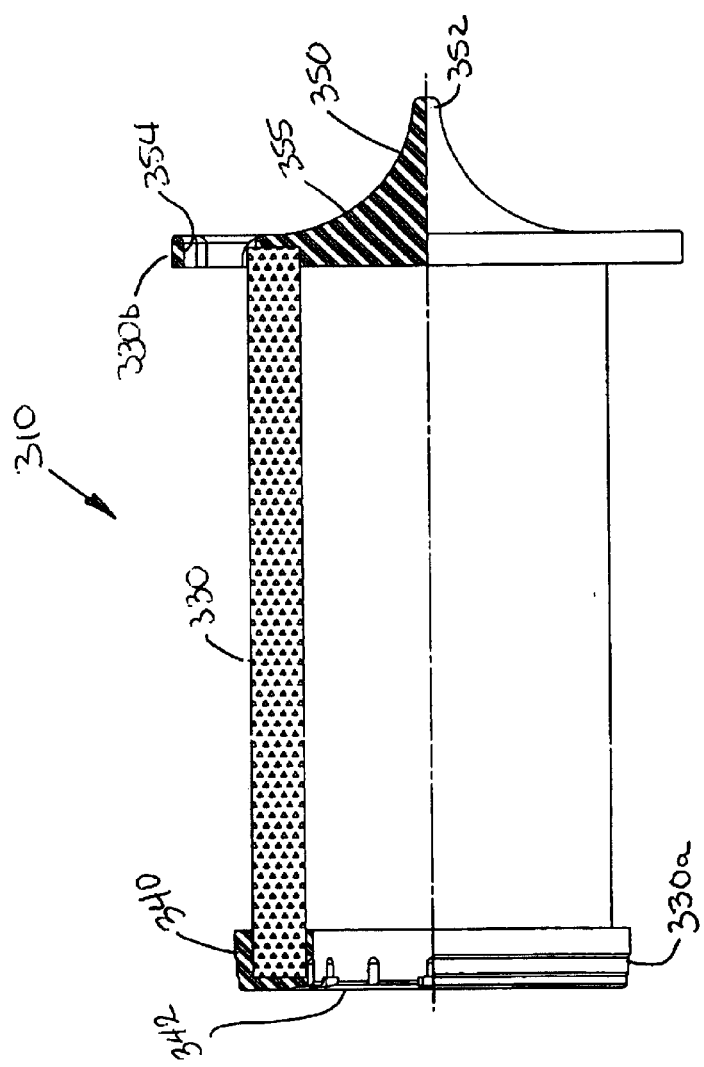
FIG. 13 is a fragmented cross-sectional view of the chemical absorption element portion of the filter assembly of FIG. 12.

Filter assembly 10b also includes an adsorbent element 310, shown enlarged in FIG. 13. Adsorbent element 310 comprises a cylindrical mass of carbon 330 extending between first and second ends 330a and 330b respectively. Carbon element 330 is in the preferred embodiment a hollow, cylindrical extrusion of activated carbon held together by a thermoplastic binder. Carbon element 330 can be produced, for example, by the teachings of U.S. Pat. No. 5,189,092 (Koslow), and U.S. Pat. No. 5,331,037 (Koslow).

In some embodiments, the filter element, such as filter element 15a, can be combined with an adsorbent element, such as adsorbent element 310, into a single construction that provides both particulate and chemical filtration. For example, a particulate removal media can be positioned around the external surface of carbon element 330. Such a construction can be longer or shorter in length than the combined distance occupied by filter element 15a and adsorbent element 310 in FIG. 12, and could be supported within housing 11b in a manner similar to that shown in FIG. 12 or not. A filter element that includes both particulate and chemical removal portions is disclosed in U.S. Pat. No. 6,152,996 (Linnersten et al.).

The extruded cylindrical carbon configuration of adsorbent carbon element 330 provides a solid surface for direct attachment of a sealing system 340 thereto at first end 330a and a cap 350 at second end 330b. Such "solid" carbon/binder extrusion also forms a unified filter element 310 that does not itself release any carbon or other particles or contaminants into the filtered air stream.

Sealing system 340 provides an air-tight seal adjacent first end 330a of adsorbent element 310 and between adsorbent element 310 and seal seat 343 and flange 345 of mounting bracket 342 (FIG. 12). Such formed seal, in combination with baffle 25b, directs air flow through adsorbent element 310, and, under normal conditions, prevent unintended levels of air from passing through mounting bracket 342 and into resonator 23 before it has first passed through the adsorbent seal element 310. With air flowing in the direction of from inlet 12b to outlet 14b, baffle 25b forms a seal downstream from mounting bracket 342 and between the inner surface of the sidewalls of housing 11b and resonator 23. Baffle 25b and sealing system 340 require all air flow from filter element 15a to pass through carbon adsorbent filter element 310 and through mounting bracket 342 before passing on to the filter assembly outlet 14b.

Sealing system 340 is typically made from a flexible, compressible material, such as polyurethane. As can be seen from FIG. 13, sealing system 340 can have a "stepped" configuration of decreasing outermost dimension, which improves seating and sealing against sealing seat 343 and extension flange 345 of mounting bracket 342. Sealing system 340 directs air flow from filter element 15a through carbon element 330 before entering resonator 23.

End cap 350, at second end 330b of adsorbent element 310, diverts air exiting filter element 15a so that it passes along the outer cylindrical surface of adsorbent element 310 rather than directly, axially moving into the central bore region of carbon element 330. Air exiting from filter element 15a impinges on a curved surface 355 of cap 350 and is rerouted from its "straight-line" flow to a flow having a radial component. Surface 355 is an arcuately shaped surface radially extending from an axially aligned tip 352. The curved surface 355 smoothly diverts the air with minimal resistance. Tip 352 is the central point of exposed surface 355 of cap 350, although in some embodiment tip 352 may not be centrally positioned on cap 350. It will be appreciated that other surface configurations of end cap 350, such as flat or stepped surfaces, could be used.

Figure 14:
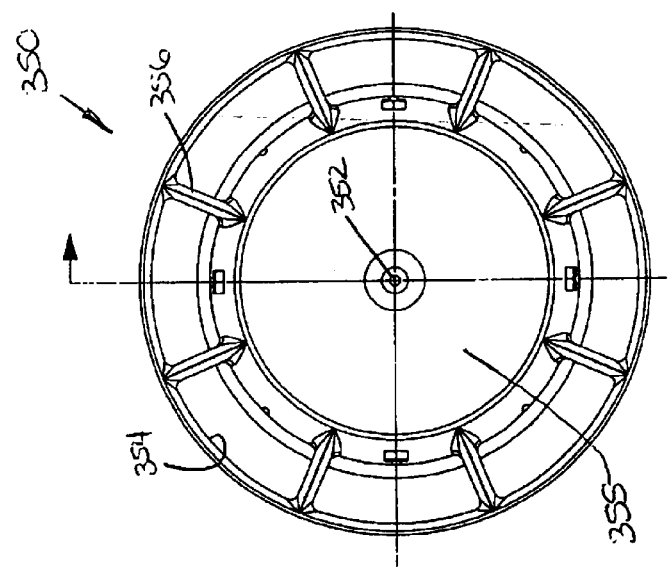
FIG. 14 is a right end view of an end cap of the chemical adsorption element of FIG. 13.

Referring to FIGS. 13 and 14, cap 350 includes apertures 354 therethough for passage of air through cap 350 and along the outer surface of carbon 330. Radial arms 356 separate apertures 354 and provide structural support to cap 350. Additionally, air may pass around the outer periphery of cap 350 and between cap 350 and the interior of housing 11b.

In addition to managing air flow, end cap 350 provides structural support and anchoring of second end 330b of absorbent element 310 to filter element 15a by engaging with frame 200, specifically, with center 215 of frame 200. Tip 352 is adapted for cooperative insertion into and retention by the recessed portion of center 215. The fit of tip 352 within frame 200 should be such so as to hold adsorbent element 310 in axial alignment with filter element 15a. The interior of housing 11b may include a retention flange that keeps the end of diverter cap 350 axially aligned when filter element 15a is removed from housing.

Each of sealing system 340 and cap 350 can be temporarily or permanently attached to carbon 330. To provide a permanent attachment, sealing system 340 can be attached to carbon 330, for example, by adhesive, or by directly molding sealing system 340 onto carbon 330. For permanent attachment of cap 350, cap 350 can be, for example, adhesively attached to carbon 330. Cap 350 may include an annular recess to accept a portion of second end 330b of carbon 330.

Adsorbent element 310 functions both as a chemical removal portion and as an element of sound suppression element 19b. Element 310 is functionally similar to adsorbent 300 of FIGS. 9 and 10 in that it comprises adsorbent material for removing chemical contaminants from the air passing therethrough or thereby. The volume between the interior of housing 11b and adsorbent element 310, designated as 24 in FIG. 12, can function as a resonator to suppress or attenuate sound. Additionally or alternatively, carbon 330 of adsorbent element 310 adsorbs sound, thus providing sound attenuation. In a preferred embodiment, adsorbent element 310 is configured to attenuate a peak of at least about 700 Hz, often greater than 700 Hz.

Other arrangements of adsorbent elements and adsorbent materials may also have both a chemical removal quality and a sound suppression quality. Additionally, physical or particular filter elements, such as filter element 15a, may have some sound suppression qualities.

Fuel Cells

In FIG. 1, equipment 101, with which filter assembly 10 of the present invention operates, includes fuel cell 102. Fuel cells are devices having two electrodes (an anode and a cathode) that sandwich an electrolyte. The primary types of known fuel cell configurations are discussed in the Background section of this specification. They all have the common characteristics briefly discussed below, but vary in operating temperatures and efficiency of operation. A hydrogen fuel source is directed to the anode, where the hydrogen electrons are freed, leaving positively charged ions. The freed electrons travel through an external circuit to the cathode and, in the process, provide an electrical current that can be used as a power source for external electrical circuits. The positively charged ions diffuse through the fuel cell electrolyte and to the cathode where the ions combine with the electrons and oxygen to form water and carbon dioxide, by-products of the process. To speed the cathodic reaction, a catalyst is often used. Examples of catalysts often used in the fuel cell reaction include nickel, platinum, palladium, cobalt, cesium, neodymium, and other rare earth metals.

The proton exchange membrane (PEM) type of fuel cell is a popular fuel cell configuration for use in powering vehicles due to its low temperature operation, high power density and ability to quickly vary its power output to meet shifts in power demand. The PEM fuel cell is often simply referred to as a "low temperature fuel cell" because of its low operation temperature, typically about 70 to 100° C., sometimes as high as 200° C. Fuel cell 102 of the preferred embodiments illustrated herein is preferably of the PEM, low temperature configuration. High temperature fuel cells are typically not as sensitive to chemical contamination due to their higher operating temperature. High temperature fuel cells are, however, sensitive to particulate contamination, and some forms of chemical contamination, and thus high temperature fuel cells may benefit from the filtering features as described herein. Both types of fuel cells, low temperature and high temperature, are usually used in combination with noisy equipment.

PEM fuel cells will benefit by being used in conjunction with a filter assembly according to the present invention. Examples of other various types of fuel cells that can be used in combination with the filter assembly of the present invention include, for example, U.S. Pat. Nos. 6,110,611; 6,117,579; 6,103,415; and 6,083,637, the disclosures of which are incorporated here by reference. Various fuel cells are commercially available from, for example, Ballard Power Systems, Inc. of Vancouver, Canada; International Fuel Cells, of Connecticut; Proton Energy Systems, Inc. of Rocky Hill, Conn.; American Fuel Cell Corp. of Massachusetts; Siemans AG of Erlangen, Germany; Energy Partners, L. C. of Florida; General Motors of Detroit, Mich.; and Toyota Motor Corporation of Japan.

Individual fuel cells, each having an anode, cathode, and electrolyte, are configured into "stacks" to provide the desired amount of external power. For example, a typical passenger bus utilizes a fuel cell stack generating about 200 kW of power.

It will be recognized by one skilled in the art of fuel cells that the principles of the filter assembly of this invention will benefit the operation of generally any fuel cell configuration.

The threshold levels of contaminants that are acceptable by various fuel cells are dependent on the design of the fuel cell. For example, hydrocarbons (methane and heavier), ammonia, sulfur dioxide, carbon monoxide, silicones, and the like, are known to occupy space on the catalyst and inactivate the sites to reaction. Thus, these contaminants need to be removed prior to their entering the reactive area of the fuel cell.

The exact level of contamination, and types of contaminants that are acceptable will vary depending on the catalyst used, the operating conditions, and the catalytic process efficiency requirements. The filter assembly of the present invention removes contaminants from the atmospheric air before the air is used in the fuel cell operation.

Compressors and Other Noise Making Equipment

Equipment 101 also typically includes some air moving equipment or air handling mechanisms that emanates noise, such as a compressor, fan, blower, or pump. This equipment provides the air (oxidizer) source to fuel cell 102. The various air moving equipment produces noise by the moving parts such as rotors, impellers, lobes, vanes, and pistons. In many instances, the frequency of the noise produced spans 3 Hertz to 30,000 Hertz, sometimes as high as 50,000 Hertz, at a level of 85 to 110 dB at one meter.

One common type of compressor 104 used in conjunction with fuel cell 102 is a "Lysholm" twin screw compressor available from Opcon Autorotor AB of Sweden. This type of compressor typically has a noise output in the range of about 160 to 1100 Hertz, and at a level as high as 110 dB at one meter. Another common compressor is a "Roots blower" compressor. Other commonly used compressors include piston compressors, diaphragm compressors, centrifugal compressors, and axial compressors.

Compressors are available from, for example, Paxton Products of Camarillo, Calif.; Pneumatec, Inc. of Kenosha, Wis.; Standard Pneumatic Products, Inc. of Newtown, Conn.; Vairex Corporation of Boulder, Colo.; and Honeywell Engines & Systems of Torrance, Calif.

Other air moving equipment that may be used with fuel cell 102 includes, for example, electric drive turbo chargers, compressor expanders, and the like.

In an attempt to optimize the operation of fuel cell 102, the air entering fuel cell 102 may be humidified, often close to its saturation point. The high level of moisture is desired to minimize any chance of the electrolytic membrane of fuel cell 102 of drying out and being incapable of carrying the charged ions. This humidification may occur upstream of compressor 104, downstream of filter assembly 10. Alternately, and possible preferably, this humidification may occur downstream of compressor 104. Drier air may be more suitable for passing through compressor 104.

Compressor Discharge Apparatus

A compressor discharge apparatus or exhaust apparatus 103 is illustrated in phantom in FIG. 1. In some processes, it may be desired or be beneficial to include a discharge apparatus such as apparatus 103 downstream of compressor 104 or other air moving equipment. Apparatus 103 can have, for example, a particulate filter, a chemical filter, a sound suppressor, or any combination thereof. The specific configuration and arrangement of apparatus 103 will depend, for example, on the desired efficiency of filter element 15 of filter assembly 10 for either or both particulate and chemical removal, and upon the requirements for the suppression of sound by filter assembly 10. In some embodiments, compressor 104 may itself contribute physical, chemical, or both types of contaminants to the air stream downstream of filter assembly 10, which will need to be processed by an apparatus 103. Further, apparatus 103 may include a humidifier that increases the moisture of the air passing therethrough. Additionally or alternatively, apparatus 103 may include a drain, floating check valve, or other device to remove excess water that has accumulated. Examples of suitable valve constructions are disclosed in U.S. Pat. No. 6,009,898 (Risch et al.) and U.S. Pat. No. 6,209,559 (Risch et al.).

Figure 16:
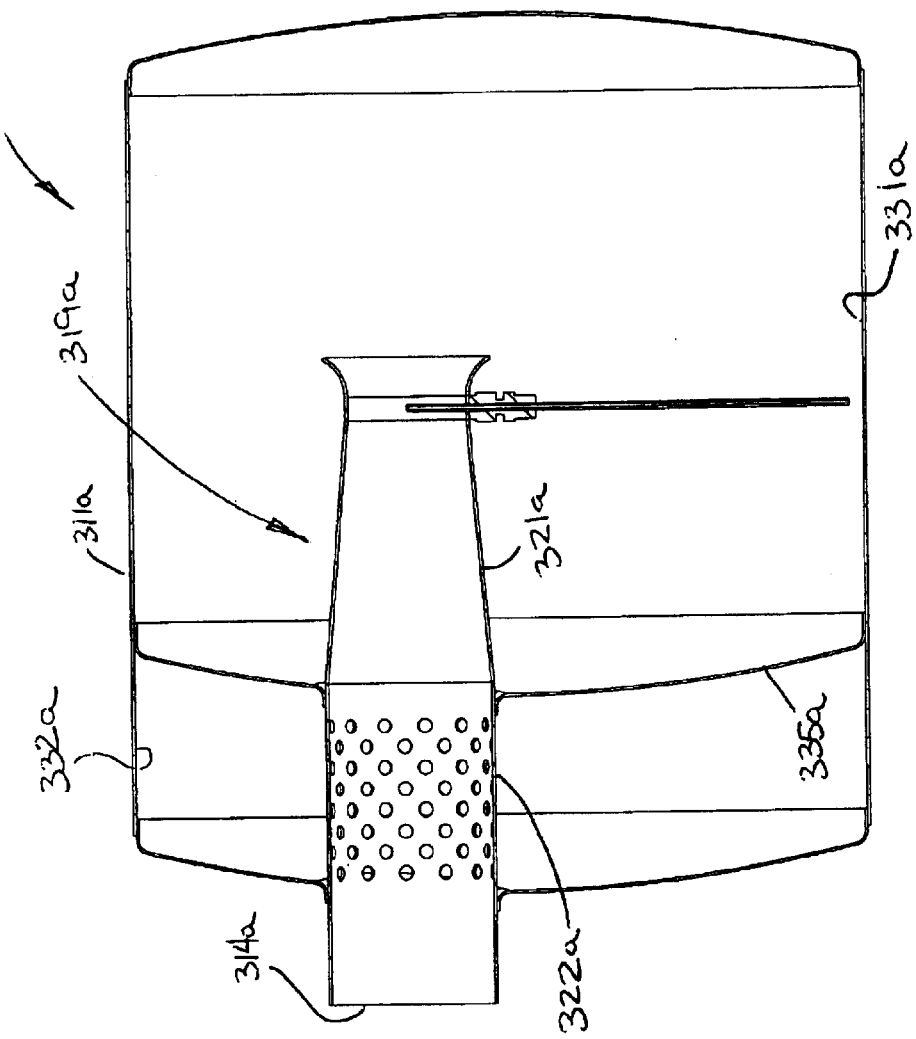
FIG. 16 is a cross-sectional view of the exhaust assembly of FIG. 15, taken along line 6—6 of FIG. 15.
Figure 15:
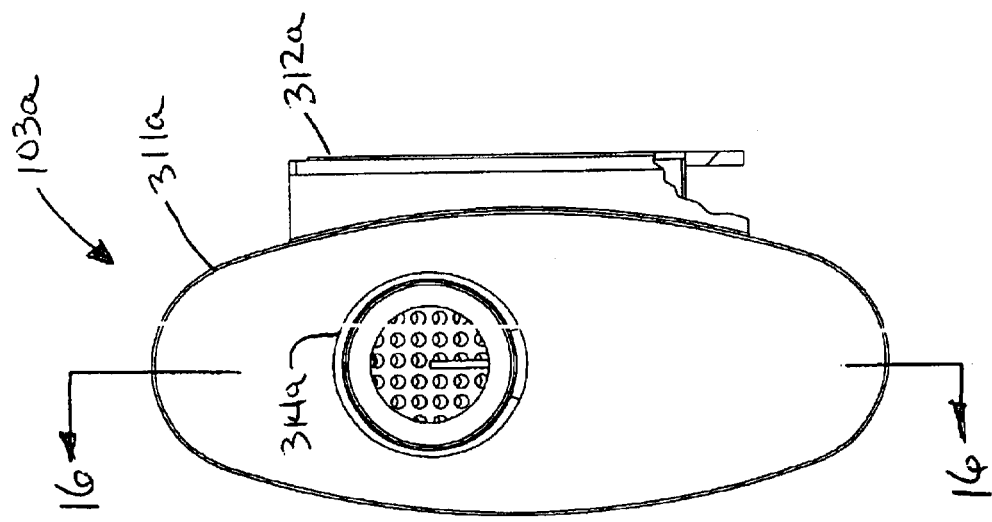
FIG. 15 is front plan view of one embodiment of an exhaust assembly of FIG. 1, configured according to the principles of the present invention.
Figure 17:
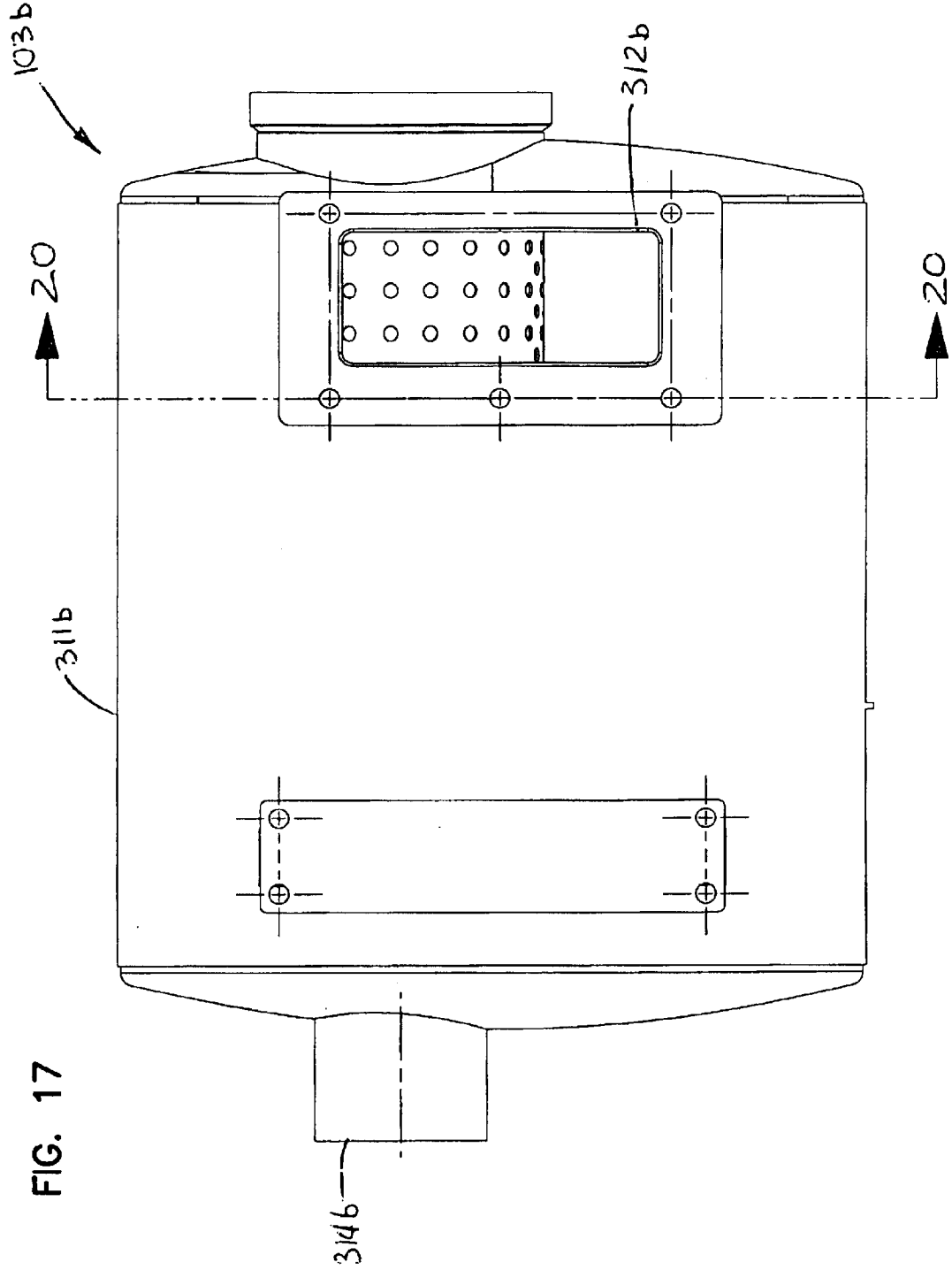
FIG. 17 is a side plan view of a second embodiment of an exhaust assembly of FIG. 1, configured according to the principles of the present invention.
Figure 18:
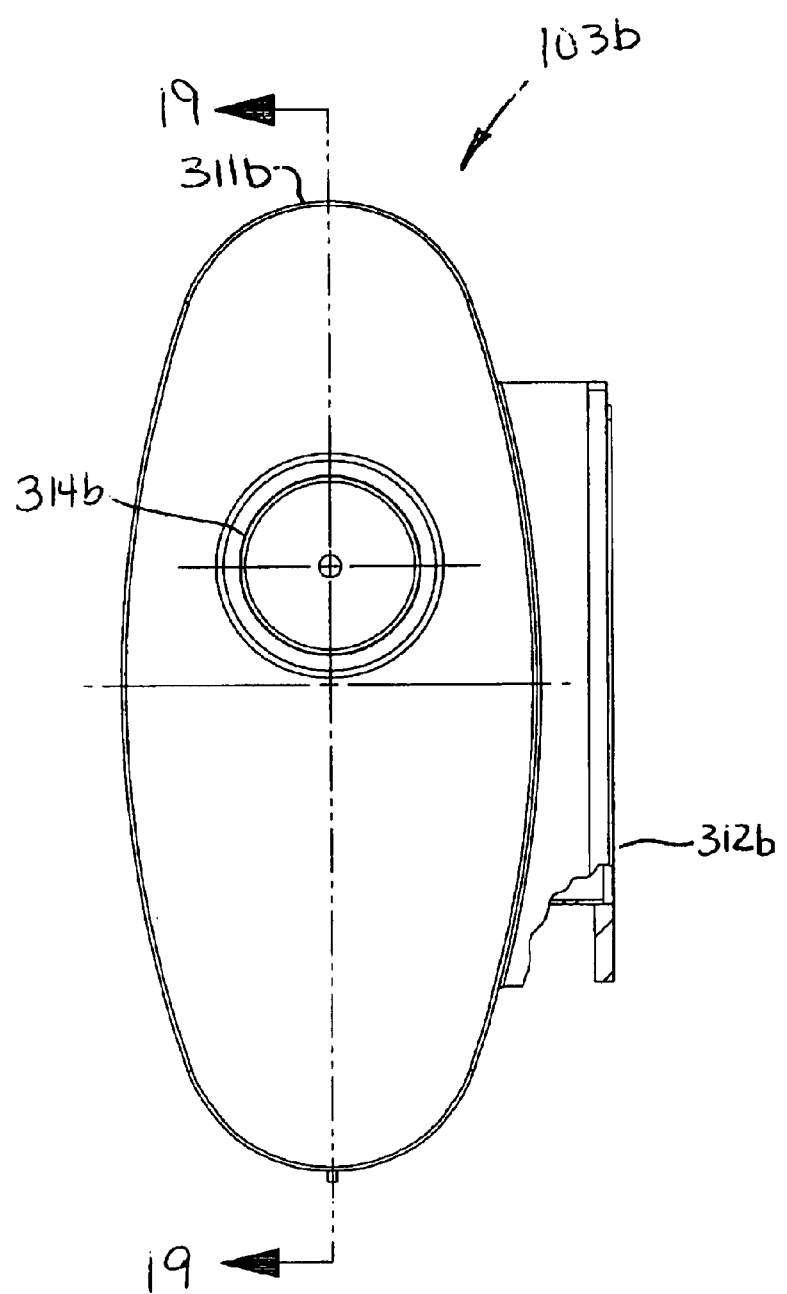
FIG. 18 is a front plan view of the exhaust assembly of FIG. 17.
Figure 19:
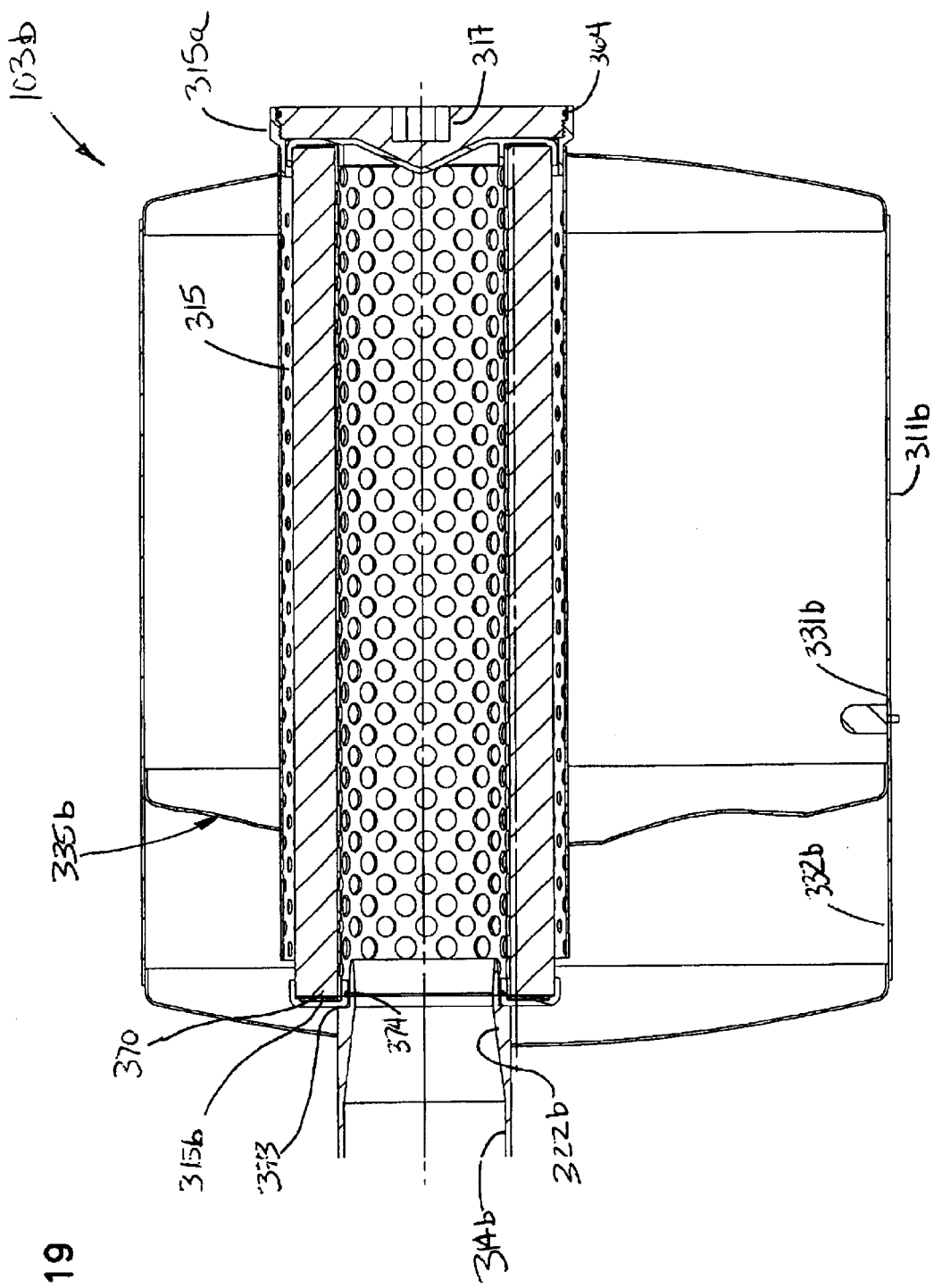
FIG. 19 is a cross-sectional view of the exhaust assembly of FIGS. 17 and 18 taken along line 19—19 of FIG. 18.
Figure 20:
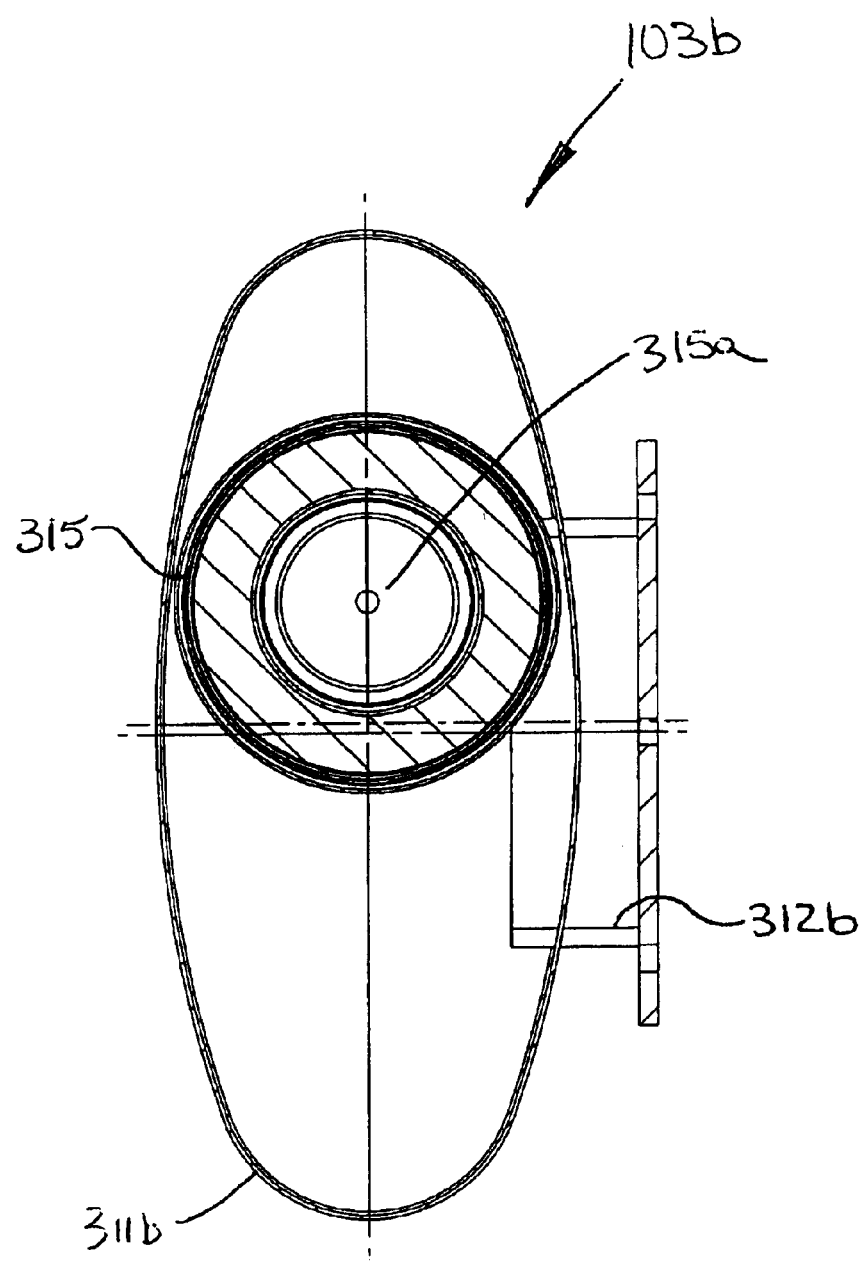
FIG. 20 is a cross sectional view of the exhaust assembly of FIGS. 17, 18 and 19 taken along line 20—20 of FIG. 17.

One embodiment of exhaust apparatus 103 is shown in FIGS. 15 and 16 as exhaust apparatus 103a. Exhaust apparatus 103a includes a housing 311a which defines an inlet 312a and an outlet 314a. Air from compressor 104 enters exhaust apparatus 103a via inlet 312a, and exits via outlet 314a to fuel cell 102. The air from compressor 104 will typically be at an elevated temperature and pressure, such as, 370° F. to 400° F. and about 3 atm. Because of these conditions, housing 311a is preferably a stainless steel alloy, such as 316 SS or 321 SS.

The embodiment of FIGS. 15 and 16 includes a sound suppression element 319a. Suppression element 319a comprises a sonic choke 321a and a resonator 322a; each of sonic choke 321a and resonator 322a is positioned within a chamber 332a, 332a, respectively. Chambers 331a, 332a are defined by housing 311a and baffle 335a. Sonic choke 321a and resonator 322a can be designed to attenuate a desired peak frequency or a range of frequencies. The sound present downstream of compressor 104 is generally the same, or at least similar to, the sound encountering filter assembly 10 upstream of compressor 104. Detailed information regarding sound suppression elements and resonators is provided above.

Another embodiment of exhaust apparatus 103 is shown in FIGS. 17 through 20 as exhaust apparatus 103b. Exhaust apparatus 103b is similar to exhaust apparatus 103a, in that exhaust apparatus 103b includes a housing 311b defining an inlet 312b and an outlet 314b, with air entering via inlet 312b and exiting via outlet 314b. The embodiment of FIGS. 17 through 20 further includes a sound suppression element 319b that comprises a resonator 322b. Similar to exhaust apparatus 103a, exhaust apparatus 103b has two sound attenuation chambers 331b, 332b that are defined by housing 311b and separation baffle 335b.

Exhaust element 103b includes a filter element 315 for removing particulate matter from the air passing through exhaust element 103b. Filter element 315 is resistant to the high temperatures and pressure present within exhaust element 103b. One example of a filter element 315 includes an extension of pleated media mounted between two end caps 315a, 315b. Preferably, perforated inner and outer liners or sleeves are positioned adjacent the media to provide support and protection to the media; such sleeves or liners are well known. The sleeves, particularly the outer sleeve, may be attached to housing 311b, so that filter element 315 can be slid into and out from the outer sleeve when filter element 315 is removed from and replaced in exhaust assembly 130b.

The filter media of filter element 315 should be able withstand the conditions downstream of compressor 102, that of elevated temperature and pressure, such as, 370° F. to 400° F. and about 3 atm, and often of high levels of humidity or moisture. Examples of usable media for filter element 315 include a polytetrafluoroethylene (PTFE) membrane carried by an aramid carrier (such as "Nomex" material), as is commercially available from Tetratec Corporation of Feasterville, Pa. Another usable media is fiberglass media. Filter element 315 may assume a number of physical shapes such as oval or obround, similar to the shape of housing 311b, or filter element 315 may be circular. Planar filter panels may also be usable.

End cap 315a is a "closed end cap" in that it extends across and covers the end of the filter media such that no fluid flow access can be gained to the inside of filter element 315 through end cap 315a. End cap 315a is essentially a cover over that end of filter element 315 that can be removed as desired, for example, but removing an attachment mechanism such as hex nut 317. An o-ring 364 provides an air-tight seal between end cap 315a and the exterior of the filter media, which may be the perforated outer sleeve or liner. Filter element 315 is removable and replaceable from housing 311b.

End cap 315b is an "open end cap"; that is, open end cap 315b includes a opening therein, preferably, centrally located. End cap 315b, which is typically a permanent feature of filter element 315, seats on seat surface 370, specifically, on seal seat or ledge 373. An o-ring 374 provides an air-tight seal between ledge 373 and end cap 315b.

Even though a filter element such as filter element 15a is present upstream of compressor 104 to remove particulate contaminants, contaminant matter may be introduced to the air stream by compressor 104. The fast spinning rotors, impellers, lobes, vanes or pistons of compressor 104 may discard minute particulate, either from being dislodged from a crevice or crease or other hidden corner. One type of contaminant is molybdenum particles, which are caused by the coating on the compressor internal parts weakening or being damaged during operation.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts and types of materials within the principles of the disclosure to the full extent indicated by the broad general meaning of the terms in which the appended claims are expressed.

We claim:

1. In combination a filter assembly and an air moving device, the filter assembly comprising:
    (a) a housing having an inlet and an outlet, the inlet being configured to receive dirty air into the filter assembly, and the outlet being configured to deliver clean air from the filter assembly;
    (b) a filter element within said housing, the filter element comprising a particulate filter portion constructed and arranged to remove particulate contaminants from the dirty air;
    (c) a sound suppression element within said housing, said suppression element constructed and arranged to provide sound attenuation of at least 6 dB at one meter for frequencies between 160 to 1100 hertz passing through the filter assembly; and,
    (d) the air moving device in fluid communication with said filter assembly.

2. The filter assembly according to claim 1, the filter element further comprising a chemical filter portion arranged to remove chemical contaminants from the dirty air.

3. The filter assembly according to claim 2, wherein said chemical filter portion comprises an adsorbent material.

4. The filter assembly according to claim 1, wherein said particulate filter portion is configured to provide straight-through flow.

5. The filter assembly according to claim 1, wherein said filter element comprises a cylindrical portion.

6. The filter assembly according to claim 1, wherein the filter element comprises an obround portion.

7. The filter assembly according to claim 1, wherein said sound suppression element comprises a resonator.

8. The filter assembly according to claim 1, wherein said sound suppression element is at least partially defined by said housing.

9. The filter assembly according to claim 1, wherein said sound suppression element is constructed and arranged to attenuate the sound passing through the filter assembly by at least 10 dB.

10. A system for producing power, the system comprising:
    (a) a fuel cell assembly having an oxidant intake port and a fuel intake port, and configured to produce electrical power from an oxidant and a fuel entering the oxidant port and the fuel intake port, respectively;

(b) a filter assembly comprising:
(i) a housing having an inlet configured to receive a dirty atmospheric air flowstream, and an outlet connected in fluid communication with the oxidant intake port;
(ii) a filter element within the housing arranged and configured to intercept the air flowstream and to deliver clean air to the outlet, the filter element comprising a particulate filter portion constructed and arranged to remove particulate contaminants from the air flowstream; and (c) a sound suppression element within said housing, said sound suppression element constructed and arranged to provide sound attenuation of at least 6 dB at one meter for sound frequencies between 160 to 1100 hertz passing through the filter assembly.

11. The system according to claim 10, wherein said sound suppression element is constructed and arranged to attenuate the sound by at least 10 dB.

12. The system according to claim 10, said filter assembly further comprising a chemical filter portion arranged to remove chemical contaminants from the airflow stream.

13. The system according to claim 12, wherein the chemical filter portion comprises an adsorbent material.

14. The system according to claim 13, wherein the adsorbent material is selected from the group consisting of activated carbon, impregnated carbon, activated carbon fibers, ion-exchange resin, ion-exchange fibers, alumina, activated alumina, molecular sieves, and silica.

15. The system according to claim 14, wherein the adsorbent material has a basic surface and is constructed and arranged to remove an acidic contaminant, the acidic contaminant being at least one of sulfur oxides, nitrogen oxides, hydrogen sulfide, hydrogen chloride, and volatile organic acids and nonvolatile organic acids.

16. The system according to claim 14, wherein the adsorbent material has an acidic surface and is constructed and arranged to remove a basic contaminant, the basic contaminant being at least one of ammonia, amines, amides, sodium hydroxides, lithium hydroxides, potassium hydroxides, volatile organic bases and nonvolatile organic bases.

17. The system according to claim 10, wherein said particulate filter portion is configured to provide straight-through flow.

18. The system according to claim 10, further comprising an air compressor.

19. The system according to claim 18, wherein the air compressor is a twin screw compressor.

* * * * *

UNITED STATES PATENT AND TRADEMARK OFFICE
CERTIFICATE OF CORRECTION

PATENT NO. : 6,780,534 B2
DATED : August 24, 2004
INVENTOR(S) : Stenersen et al.

It is certified that error appears in the above-identified patent and that said Letters Patent is hereby corrected as shown below:

Title page,
Item [75], Inventors, "Elvind" should read -- Eivind --

Signed and Sealed this

Thirtieth Day of November, 2004

JON W. DUDAS
*Director of the United States Patent and Trademark Office*